United States Patent
Nabki et al.

(10) Patent No.: US 12,445,158 B2
(45) Date of Patent: Oct. 14, 2025

(54) METHODS AND SYSTEMS FOR ULTRA WIDEBAND (UWB) RECEIVERS

(71) Applicant: SPARK MICROSYSTEMS INC., Montreal (CA)

(72) Inventors: Frederic Nabki, Montreal (CA); Dominic Deslandes, Montreal (CA); Michiel Soer, Montreal (CA); Gabriel Morin-Laporte, Montreal (CA); Mohammad Taherzadeh-Sani, Montreal (CA)

( * ) Notice: Subject to any disclaimer, the term of this patent is extended or adjusted under 35 U.S.C. 154(b) by 0 days.

(21) Appl. No.: 18/527,085

(22) Filed: Dec. 1, 2023

(65) Prior Publication Data

US 2024/0106478 A1    Mar. 28, 2024

Related U.S. Application Data

(62) Division of application No. 17/593,322, filed as application No. PCT/CA2020/000029 on Mar. 18, 2020, now Pat. No. 12,040,826.

(Continued)

(51) Int. Cl.
*H04B 1/26* (2006.01)
*H04B 1/69* (2011.01)
(Continued)

(52) U.S. Cl.
CPC ............ *H04B 1/26* (2013.01); *H04B 1/69* (2013.01); *H04B 17/336* (2015.01); *H04W 56/0015* (2013.01)

(58) Field of Classification Search
CPC ........ H04B 1/69; H04B 1/7176; H04L 1/0042
See application file for complete search history.

(56) References Cited

U.S. PATENT DOCUMENTS 10,257,708 B1    4/2019  Kamkar et al.
2004/0136399 A1  7/2004  Roberts
(Continued)

FOREIGN PATENT DOCUMENTS

CN    101662448 B    3/2010
WO    2016191851 A1  12/2016
WO    2019000075 A1  1/2019

OTHER PUBLICATIONS

Lee et al. "An IR-UWB CMOS Transceiver for High-Data-Rate, Low-Power, and Short-Range Communication," in IEEE Journal of Solid-State Circuits, vol. 54, No. 8, pp. 2163-2174 (Year: 2019).*

(Continued)

*Primary Examiner* — Sam K Ahn
*Assistant Examiner* — Amneet Singh
(74) *Attorney, Agent, or Firm* — Rosenberg, Klein & Lee

(57) ABSTRACT

Ultra-Wideband (UWB) wireless technology transmits digital data as modulated coded impulses over a very wide frequency spectrum with very low power over a short distance. Accordingly, the inventors have established UWB devices which accommodate and adapt to inaccuracies, errors, or issues within the implemented electronics, hardware, firmware, and software. Beneficially, UWB receivers may accommodate offsets in absolute frequency between their frequency source and the transmitter, accommodate drift arising from phase locked loop and/or from relative clock frequency offsets of the remote transmitter and local receiver. UWB devices may also employ modulation coding schemes offering increased efficiency with respect to power, data bits per pulse transmitted, and enabled operation at higher output power whilst complying with regulatory emission requirements. Further, UWB devices may support a ranging function with range/accuracy not limited to the low (Continued)

frequency master clock employed within these devices enabling operation with ultra-low power consumption.

4 Claims, 15 Drawing Sheets

Related U.S. Application Data

(60) Provisional application No. 62/819,834, filed on Mar. 18, 2019.

(51) Int. Cl.
*H04B 17/336* (2015.01)
*H04W 56/00* (2009.01)

(56) References Cited

U.S. PATENT DOCUMENTS

| | | | | |
|---|---|---|---|---|
| 2005/0013345 | A1* | 1/2005 | Choi | H04B 1/71632 |
| | | | | 375/130 |
| 2007/0200759 | A1 | 8/2007 | Heidari-Bateni et al. | |
| 2009/0179782 | A1* | 7/2009 | Hollis | H03M 5/145 |
| | | | | 341/55 |
| 2010/0318851 | A1* | 12/2010 | Learmonth | G06F 11/1645 |
| | | | | 714/37 |
| 2012/0224852 | A1* | 9/2012 | Liu | H04L 27/3483 |
| | | | | 398/189 |
| 2015/0147069 | A1* | 5/2015 | Brandt-Pearce | H04L 25/4902 |
| | | | | 398/186 |
| 2020/0059788 | A1 | 2/2020 | Kamkar et al. | |
| 2020/0089728 | A1* | 3/2020 | Kondou | G06N 5/01 |
| 2020/0133832 | A1* | 4/2020 | Xu | G11C 16/10 |

OTHER PUBLICATIONS

Simon et al. "Multi-pulse pulse-position-modulation signaling for optical communication with direct detection." IPN Progress Report 42 (2003): 155. (Year: 2003).*
Gomes ("N-dimensional Pulse Shape and Position Modulation for high speed UWB communication," 2014 International Conference on Circuits, Systems, Communication and Information Technology Applications (CSCITA), Mumbai, India, 2014, pp. 126-131) (Year: 2014).*
Yi et al. ("Photonic Multi-Pulse Position Modulation UWB Pulse Generation by Pre-Coding and Optical Differentiating," 2016 Asia Communications and Photonics Conference (ACP), Wuhan, China, 2016, pp. 1-3) (Year: 2016).*
Selmy et al. ("Bandwidth utilization enhancement for MPPM using gradual multi-pulse pulse position modulation," 2012 17th European Conference on Networks and Optical Communications, Vilanova i la Geltru, Spain, 2012, pp. 1-6) (Year: 2012).*
Wolf et al.: "Coherent Multi-Ranging for Narrowband LPWAN: Simulation and Experimentation Results" 15th Workshop on Positioning, Navigation and Communications, 2018.
Colli-Vignarelli et al.: "Concurrent Transmissions in IR-UWB Networks : an Experimental Validation", IEEE International Conference on Ultra-Wideband (ICUWB 2009), Sep. 9, 2009 (Sep. 9, 2009), pp. 337-342.
Colli-Vignarelli et al.: "A Discrete-Component Impulse-Radio Ultra-Wide Band (IR-UWB) Receiver with I/Q Demodulation", Phd Research in Microelectronics and Electronics (PRIMA), 2011 7th Conference, IWWW, Jul. 3, 2011 (Jul. 3, 2011), pp. 245-248.
Taghipour et al.: "Comparison of Kurtosis and Fourth Power Detectors with Applications to IR-UWB OOK Systems", International Journal of Communications, Network and System Sciences, vol. 05, No. 01, Jan. 1, 2012 (Jan. 1, 2012), pp. 43-49.
Thorbjornsen et al.: "Radio Frequency (RF) Time-of-Flight Ranging for Wireless Sensor Networks", Measurement Science and Technology, vol. 21, No. 3, Mar. 1, 2010 (Mar. 1, 2010).

* cited by examiner

| Decoded | Encoded |
|---------|---------|
| 0000    | 000000  |
| 0001    | 000011  |
| 0010    | 000101  |
| 0011    | 000110  |
| 0100    | 001001  |
| 0101    | 001010  |
| 0110    | 001100  |
| 0111    | 100100  |

| Decoded | Encoded |
|---------|---------|
| 1000    | 010001  |
| 1001    | 010010  |
| 1010    | 010100  |
| 1011    | 100010  |
| 1100    | 011000  |
| 1101    | 110000  |
| 1110    | 101000  |
| 1111    | 100001  |

Figure 8

| Modulation | OOK | 1-bit PPM | 2-bit PPM | 4-bit PPM | Double PPM | 'Invertable' OOK |
|---|---|---|---|---|---|---|
| Energy Cost (nJ/bit) | 1 | 2 | 2 | 4 | 1.5 | Between 1 and 1.1 |
| Worst-case Spectral Efficiency | 1 bit/pulse | 1 bit/pulse | 2 bit/pulse | 4 bit/pulse | 2 bit/pulse | ~1.99... bit/pulse |
| Link Robustness |  |  |  |  |  |  |
| Design Complexity | Ultra-low | Low | Medium | High | High | High |

| Decoded | Encoded | Decoded | Encoded | Decoded | Encoded | Decoded | Encoded |
|---|---|---|---|---|---|---|---|
| 00000 | 00000001 | 01000 | 00010001 | 10000 | 00100001 | 11000 | 00110000 |
| 00001 | 00000011 | 01001 | 00010010 | 10001 | 00100010 | 11001 | 01100000 |
| 00010 | 00000101 | 01010 | 00010100 | 10010 | 00100100 | 11010 | 10000100 |
| 00011 | 00000110 | 01011 | 10010000 | 10011 | 01000010 | 11011 | 00010000 |
| 00100 | 00001001 | 01100 | 00011000 | 10100 | 00101000 | 11100 | 01010000 |
| 00101 | 00001010 | 01101 | 10000010 | 10101 | 10001000 | 11101 | 00001000 |
| 00110 | 00001100 | 01110 | 01001000 | 10110 | 10100000 | 11110 | 10000000 |
| 00111 | 01000100 | 01111 | 01000000 | 10111 | 00100000 | 11111 | 11000000 |

Figure 10

METHODS AND SYSTEMS FOR ULTRA WIDEBAND (UWB) RECEIVERS

CROSS-REFERENCE TO RELATED APPLICATIONS

This application claims the benefit of priority as a divisional patent application of U.S. patent application Ser. No. 17/593,322 filed Sep. 15, 2021; which itself claims the benefit of priority as a 371 National Phase entry patent application of PCT/CA2020/000029 filed Mar. 18, 2020; which itself claims priority from U.S. Provisional Patent Application 62/819,834 filed Mar. 18, 2019; the entire contents of each being incorporated herein by reference.

FIELD OF THE INVENTION

This invention relates to ultra-wideband wireless communication systems and more particularly ultra-wideband receivers for such ultra-wideband wireless communication systems.

BACKGROUND OF THE INVENTION

Ultra-Wideband (UWB) technology is a wireless technology for the transmission of large amounts of digital data as modulated coded impulses over a very wide frequency spectrum with very low power over a short distance. Such pulse based transmission being an alternative to transmitting using a sinusoidal wave which is then turned on or off, to represent the digital states, as employed within today's wireless communication standards and systems such as IEEE 802.11 (Wi-Fi), IEEE 802.15 wireless personal area networks (PANs), IEEE 802.16 (WiMAX), Universal Mobile Telecommunications System (UMTS), Global System for Mobile Communications (GSM), General Packet Radio Service (GPRS), and those accessing the Industrial, Scientific and Medical (ISM) bands, and International Mobile Telecommunications-2000 (IMT-2000).

UWB systems are well-suited to short-distance applications in a variety of environments, such as depicted in FIG. 1 including peripheral and device interconnections, as exemplified by first residential environment 110, sensor networks, as exemplified by second residential environment 120, control and communications, as exemplified by industrial environment 130, medical systems, as exemplified by medical imaging 150, and personal area networks (PAN), as exemplified by PAN 140. Due to low emission levels permitted by regulatory agencies such UWB systems tend to be short-range indoor applications but it would be evident that a variety of other applications may be considered where such regulatory restrictions are relaxed and/or not present addressing military and civilian requirements for communications between individuals, electronic devices, control centers, and electronic systems for example.

Accordingly, it would be beneficial for UWB transmitters, UWB receivers and UWB transceivers to accommodate and adapt to what are commonly referred to as inaccuracies, errors, or issues within the implemented electronics, hardware, firmware, and software.

Accordingly, it would be beneficial for receivers to accommodate offsets in absolute frequency between their frequency source and that within the transmitter.

It would be further beneficial for the UWB radios to employ modulation coding schemes that are more efficient with respect to power, data bits per pulse transmitted, and enabled operation at higher output power whilst complying with regulatory emission requirements.

It would be further beneficial for the UWB receivers to accommodate drift within their own electronics arising from phase locked loop and/or from relative clock frequency offsets of the remote transmitter and local receiver.

It would be further beneficial for UWB devices to support a ranging function over a range and with an accuracy that are not limited by the low frequency master clock employed within these devices to enable their operation with ultra-low power consumption.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to ultra-wideband wireless communication systems and more particularly ultra-wideband receivers for such ultra-wideband wireless communication systems.

In accordance with an embodiment of the invention there is provided a UWB receiver comprising:
an antenna for receiving wireless signals coupled to a signal processing circuit; and
the signal processing circuit comprising:
an RF front end circuit comprising:
a first amplifier coupled to the antenna;
a first filter coupled to the output of the first amplifier; and
a mixer coupled to the output of the first filter and receiving a clock signal;
first and second intermediate frequency processing circuits each coupled to one of an in phase output port and a quadrature output port of the mixer;
a summation circuit coupled to the outputs of the first squaring circuits within the first and second intermediate frequency processing circuits; and
a third intermediate frequency processing circuit coupled to the output of the summation circuit.

In accordance with an embodiment of the invention there is provided a UWB receiver comprising:
an antenna for receiving wireless signals coupled to a signal processing circuit; and
the signal processing circuit comprising:
an RF front end circuit comprising:
a first amplifier coupled to the antenna;
a first filter coupled to the output of the first amplifier; and
a mixer coupled to the output of the first filter and receiving a clock signal;
a first intermediate frequency processing circuit coupled to an in phase output port of the mixer;
a second intermediate frequency processing circuits coupled to the quadrature output port of the mixer;
a third intermediate frequency processing circuit coupled to the output of first intermediate frequency processing circuit; and
a fourth intermediate frequency processing circuit coupled to the output of the second intermediate frequency processing circuit.

In accordance with an embodiment of the invention there is provided a method of encoding data for transmission comprising merging at least a first pulse N-bit symbol with a second pulse N-bit symbol to generate an R-pulse 2N-bit Encoded Bundle Pulse Modulation (EDPM) symbol, wherein R and N are positive integers greater than or equal to 2.

In accordance with an embodiment of the invention there is provided a method of encoding data for transmission comprising:
receiving a M bits of data to be transmitted;
establishing an M-bit encoding scheme for transmission of the M bits of data;
generating a pulse bundle for transmission in dependence upon the M bits of data; and
transmitting the pulse bundle into a time slot of $2^M$ time slots.

In accordance with an embodiment of the invention there is provided a method of encoding data for transmission comprising:
receiving digital data to be transmitted;
encoding the digital data to be transmitted;
determining whether a number of a first symbol or a set of first symbols within the encoded data exceeds a predetermined threshold;
upon determining that the number of the first symbol or a set of first symbols within the encoded data exceeds a predetermined threshold inverting the encoded data to generate data for transmission;
upon determining that the number of the first symbol or a set of first symbols within the encoded data does not exceed a predetermined threshold using the encoded data to generate the data for transmission;
providing a first portion of a data packet for transmission defining whether the encoded data has been inverted or not;
providing the data for transmission as a second portion of the data packet for transmission.

In accordance with an embodiment of the invention there is provided a clock controller comprising:
a first input port for receiving a symbol clock;
a second input port for receiving a delayed version of the symbol clock;
a third input port for receiving a remove clock pulse signal from a controller forming part of a wireless device also comprising the clock controller;
a fourth input port for receiving an add clock pulse signal from the controller;
a first output port for generating a second symbol signal for the wireless device in dependence upon the symbol clock, the add clock pulse signal and the remove clock pulse signal; and
a second output port for generating a symbol signal in dependence upon at least the add clock pulse signal.

In accordance with an embodiment of the invention there is provided a clock controller comprising:
providing a first symbol clock to a controller; and
providing the controller, the controller for determining in dependence upon synchronous digital inputs when to insert an extra clock pulse into a second symbol clock generated by the controller from the first symbol clock and when to remove or suppress a clock pulse from the second symbol clock.

In accordance with an embodiment of the invention there is provided a method comprising:
providing a wireless receiver receiving first data to be decoded;
establishing a first integration window of a plurality of integration windows for an energy based detector forming part of the wireless receiver which processes the received first data from which second data is decoded;
processing the analog-to-digital converter (ADC) code values of the N last '0's within the received first data for the first integration window and the ADC code values of the N last '1's within the received first data for the first integration window to generate a first coarse metric of received signal-to-noise ratio;
establishing a second coarse metric of received signal-to-noise ratio for a second integration window of the plurality of integration windows, the second integration window of the plurality of integration windows being an integration window prior to the first integration window of the plurality of integration windows;
establishing a third coarse metric of received signal-to-noise ratio for a third integration window of the plurality of integration windows, the third integration window of the plurality of integration windows being a subsequent integration window to the first integration window of the plurality of integration windows;
determining in dependence upon the first coarse metric of received signal-to-noise ratio, the second coarse metric of received signal-to-noise ratio, and the third coarse metric of received signal-to-noise ratio whether to digitally select a different a current integration window for the energy based detector from the first integration window of the plurality of integration windows to either the second integration window of the plurality of integration windows or third integration window of the plurality of integration windows.

In accordance with an embodiment of the invention there is provided a method comprising:
establishing a first phase relating to a first wireless signal received from a first node at a second node;
establishing a second phase of a second wireless signal received by the first node from the second node;
establishing a result in dependence upon an average of the first phase and an average of the second phase;
establishing a phase relating to a time of flight of wireless signals propagating between the first node and second node;
correcting the phase relating to the time of flight for a first delay within a first receiver forming part of the second node and a second delay within a second receiver forming part of the first node;
establishing a distance in dependence upon the phase relating to the time of flight and an integer number of clock cycles of delay relating to the time between a predetermined point in the transmission of the first wireless signal and a predetermined point in the receipt of the second wireless signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 8 depicts an example of 4-bit double PPM encoding scheme according to an embodiment of the invention;

FIG. 10 depicts an example of a 5-bit double PPM encoding scheme according to an embodiment of the invention;

DETAILED DESCRIPTION

Figure 1:
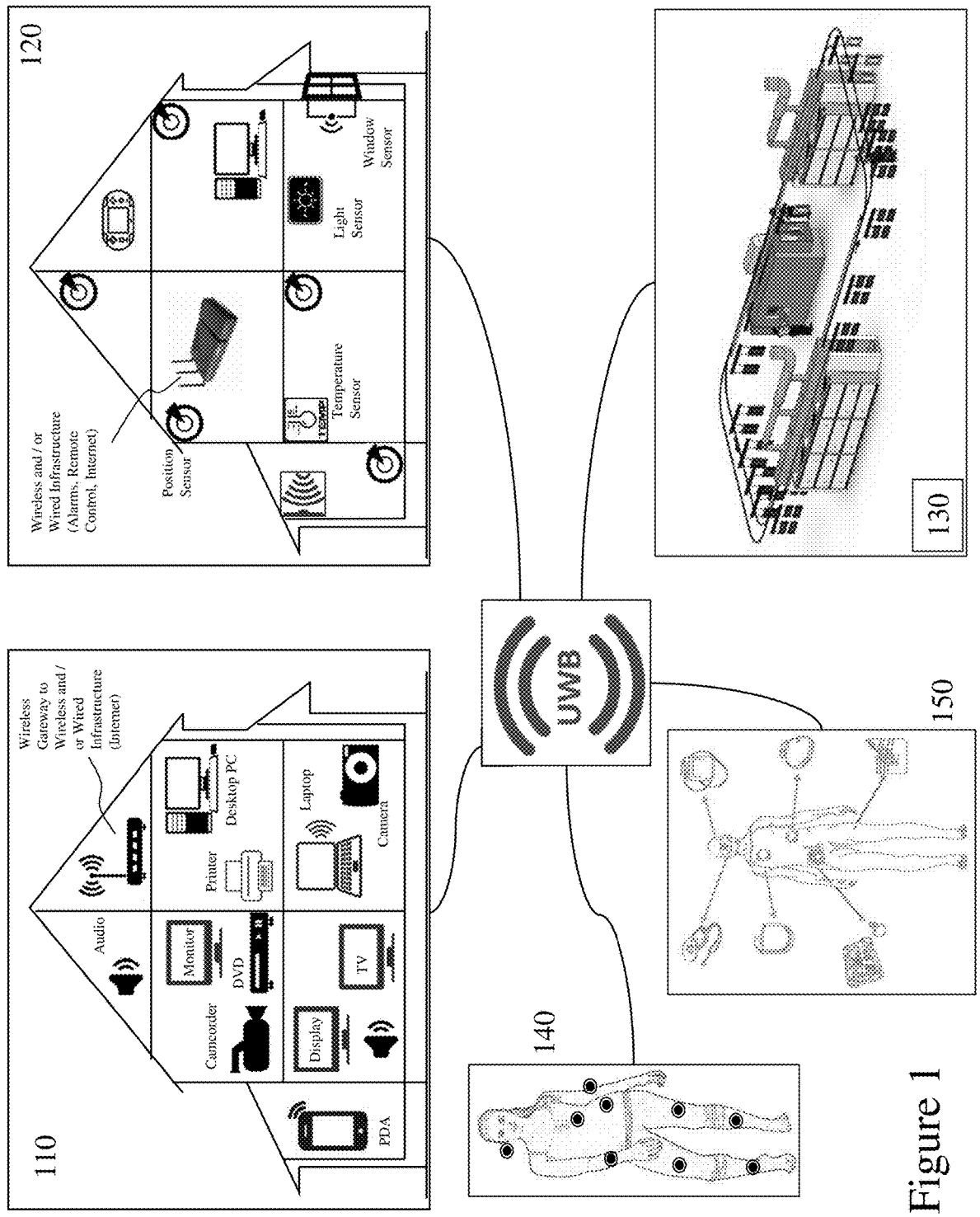
FIG. 1 depicts applications of UWB transmitters, receivers, and systems according to embodiments of the invention.

The present invention is directed to ultra-wideband wireless communication systems and more particularly ultra-wideband receivers for such ultra-wideband wireless communication systems.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

0. Impulse Radio Ultra Wideband System

As discussed supra UWB offers many potential advantages such as high data rate, low-cost implementation, and low transmit power, ranging, multipath immunity, and low interference. The Federal Communications Commission (FCC) regulations for UWB reserved the unlicensed frequency band between 3.1 GHz and 10.6 GHz for indoor UWB wireless communication system wherein the low regulated transmitted power allows such UWB systems to coexist with other licensed and unlicensed narrowband systems. Therefore, the limited resources of spectrum can be used more efficiently. On the other hand, with its ultra-wide bandwidth, a UWB system has a capacity much higher than the current narrowband systems for short range applications. Two possible techniques for implementing UWB communications are Impulse Radio (IR) UWB and multi-carrier or multi-band (MB) UWB. IR-UWB exploits the transmission of ultra-short (of the order of nanosecond) pulses, although in some instances in order to increase the processing gain more than one pulse represents a symbol. In contrast MB-UWB systems use orthogonal frequency division multiplexing (OFDM) techniques to transmit the information on each of the sub-bands. Whilst OFDM has several good properties, including high spectral efficiency, robustness to RF and multi-path interferences. However, it has several drawbacks such as up and down conversion, requiring mixers and their associated high power consumption, and is very sensitive to inaccuracies in frequency, clock, and phase. Similarly, non-linear amplification destroys the orthogonality of OFDM. Accordingly, MB-UWB is not suitable for low-power and low cost applications.

In contrast IR-UWB offers several advantages, including unlicensed usage of several gigahertz of spectrum, offers great flexibility of spectrum usage, and adaptive transceiver designs can be used for optimizing system performance as a function of the data rate, operation range, available power, demanded quality of service, and user preference. Further, multi-Gb/s data-rate transmission over very short range is possible and due to the ultra-short pulses within IR-UWB it is very robust against multipath interference, and more multipath components can be resolved at the receiver in some implementations, resulting in higher performance. Further, the ultra-short pulses support sub-centimeter ranging whilst the lack of up and down conversion allows for reduced implementation costs and lower power transceiver implementations. Beneficially, ultra-short pulses and low power transmissions make IR-UWB communications hard to eavesdrop upon.

An IR-UWB transmitter as described below in respect of embodiments of the invention in with reference to FIGS. 2 and 3 respectively exploits an on-demand oscillator following a pulse generator in order to up-convert the pulses from the pulse generated whilst avoiding the requirement of a separate mixer. Implementable in standard CMOS logic both the pulse generator and the on-demand oscillator are digitally tunable in order to provide control over the pulse bandwidth and center frequency. Further, by exploiting a digitally controlled ring oscillator for the on-demand oscillator the IR-UWB transmitter is designed to allow very quick frequency adjustments on the order of the pulse repetition rate (PRR). Beneficially this technique provides the same advantages as MB-OFDM in respect of spectrum configurability, achieved by sequentially changing the transmitted spectrum using a frequency hopping scheme, whilst maintaining the benefits of IR-UWB. Further, by providing advanced duty cycling with fast power up time combined with On-Off Shift Keying (OOK) modulation the IR-UWB according to embodiments of the invention allows significant reductions in power consumption by exploiting the low duty cycle of a UWB symbol and the fact that only half the symbols require sending energy.

In addition to defining the operating frequency range for UWB systems the different regulatory bodies all specify and enforce a specific power spectral density (PSD) mask for UWB communications. A PSD mask as may be employed in respect of embodiments of the invention is the FCC mask for which mask data are summarized in Table 1 below for the 3100 MHz-10600 MHz (3.1 GHz-10.6 GHz) range.

TABLE 1

FCC Masks for Indoor-Outdoor for Different Frequency Bands

| Frequency Range | Indoor EIRP Limit (dBm/MHz) | Outdoor EIRP Limit (dBm/MHz) |
| --- | --- | --- |
| <960 | −49.2 | −49.2 |
| 960-1610 MHz | −75.3 | −75.3 |
| 1610-1990 MHz | −53.3 | −63.3 |
| 1990-3100 MHz | −51.3 | −61.3 |
| 3100-10600 MHz | −41.3 | −41.3 |
| >10600 MHz | −51.3 | −61.3 |

Accordingly, it would be evident that the upper limit of −41.3 dB/MHz across the 3.1 GHz-10.6 GHz frequency range is the same limit imposed on unintentional radiation for a given frequency in order not to interfere with other radios. Basically, for a given frequency, the UWB radio operates under the allowed noise level which creates the relationship presented in Equation (1) between $E_p$, the transmitted energy per pulse, the maximum spectral power S, the bandwidth B, the bit rate $R_b$ and the number of pulses per bits $N_{ppb}$.

$$E_p \cdot N_{ppb} \cdot R_b \leq S \cdot B \quad (1)$$

The IEEE has published a few standards for a physical layer (PHY) for UWB radio in Personal Area Networks (IEEE 802.15.4a-2007), Body Area Networks (IEEE 802.15.4a-2007) and Radio-Frequency Identification (IEEE 802.15.4f-2012). These standards use mostly relatively large pulses resulting in relatively narrow bandwidth which is up-converted to a specific center frequency in order to fill predetermined channels. The data is encoded using pulse-position-modulation (PPM) and bi-phasic shift keying (BPSK) is used to encode redundancy data. Every bit consists of one or more pulses scrambled in phase depending on the target data rate. These standards allow considerable flexibility on channel availability and data rates. The standard also defines the preamble, headers for the data packet and ranging protocol.

These IEEE standards are designed with multiple users in mind and use different channels to transmit the data, thereby putting a heavy constraint on pulse bandwidth and limiting the transmitted energy. Prior art on non-standard transmitter attempts to make better use of the available spectrum by using narrow pulses, which therefore have a larger bandwidth thereby increasing the maximum transmitted energy according to Equation (1). Accordingly, these transmitters are non-standard and were also designed for different data rates, frequencies, pulse width, etc. Additionally, they also used various encoding schemes, most notably PPM, OOK or BPSK.

Within the work described below the inventors have established improvements with respect to UWB systems, UWB transmitters and energy based UWB receivers which are capable of generating and adapting to a variety of IR-UWB pulses and bit encoding schemes thereby supporting communications from both IR-UWB transmitters compliant to IEEE standards as well as those that are non-standard. These improvements are made with respect to UWB transmitters, UWB receivers, UWB transceivers and UWB systems such as those described and depicted by the inventors within WO/2019/000075 "Energy Efficient Ultra-Wideband Impulse Radio Systems and Methods" (PCT/CA2018/000,135 filed Jun. 29, 2018); WO 2016/191851 "Systems and Methods for Spectrally Efficient and Energy Efficient Ultra-Wideband Impulse Radios with Scalable Data Rates" (PCT/CA2016/000,161 filed May 31, 2016); and WO/2015/103,692 "Systems and Methods Relating to Ultra-Wideband Broadcasting comprising Dynamic Frequency and Bandwidth Hopping" (PCT/CA2015/000,007, filed Jan. 7, 2015)."

1. IR-UWB Transmitter Circuit

Figure 2:
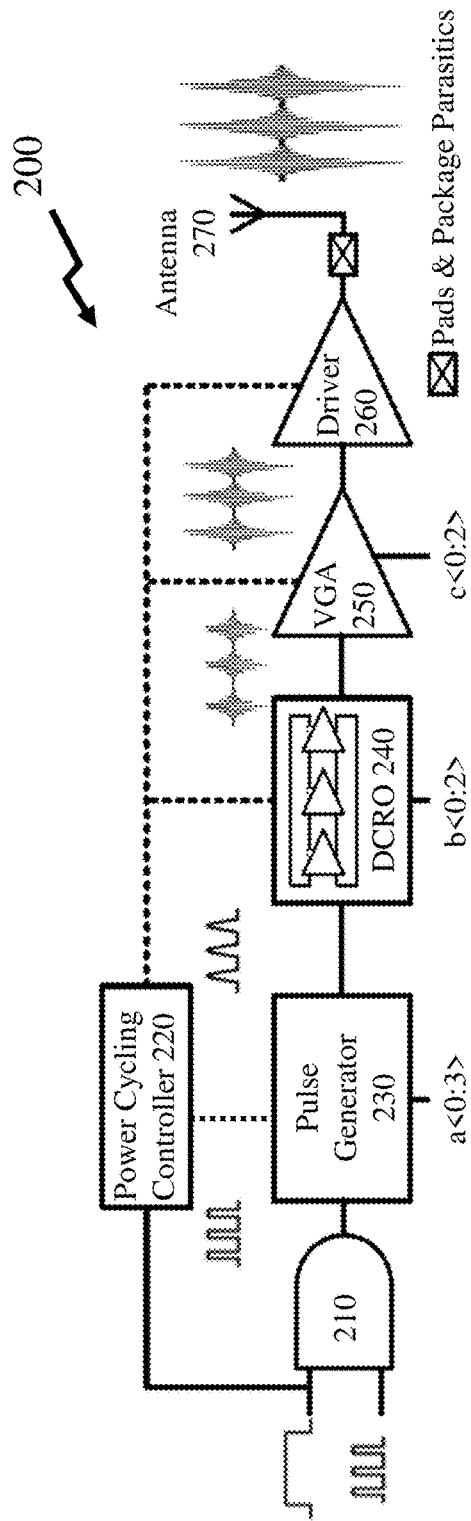
FIG. 2 depicts a block diagram of a UWB transmitter according to an embodiment of the invention.

Referring to FIG. 2 there is depicted schematically an exemplary architecture for an IR-UWB transmitter 200 according to embodiments of the invention which is composed of five main blocks plus the antenna. First a programmable impulse is produced by a pulse generator 230 at clocked intervals when the data signal from AND gate 210 is high based upon control signals presented to the AND gate 210. The pulses from the pulse generator 230 are then up-converted with a programmable multi-loop digitally controlled ring oscillator (DCRO) 240. The output from the DCRO 240 is then coupled to a variable gain amplifier (VGA) 250 in order to compensate for any frequency dependency of the pulse amplitude. Finally, a driver 260 feeds the antenna 270, overcoming typical package parasitics, such as arising from packaging the transceiver within a quad-flat no-leads (QFN) package. In order to further reduce the power consumption of the IR-UWB transmitter (IR-UWB-Tx) 200 according to embodiments of the invention a power cycling controller 220 dynamically switches on or off these functional blocks when the data signal is low.

Figure 3A:
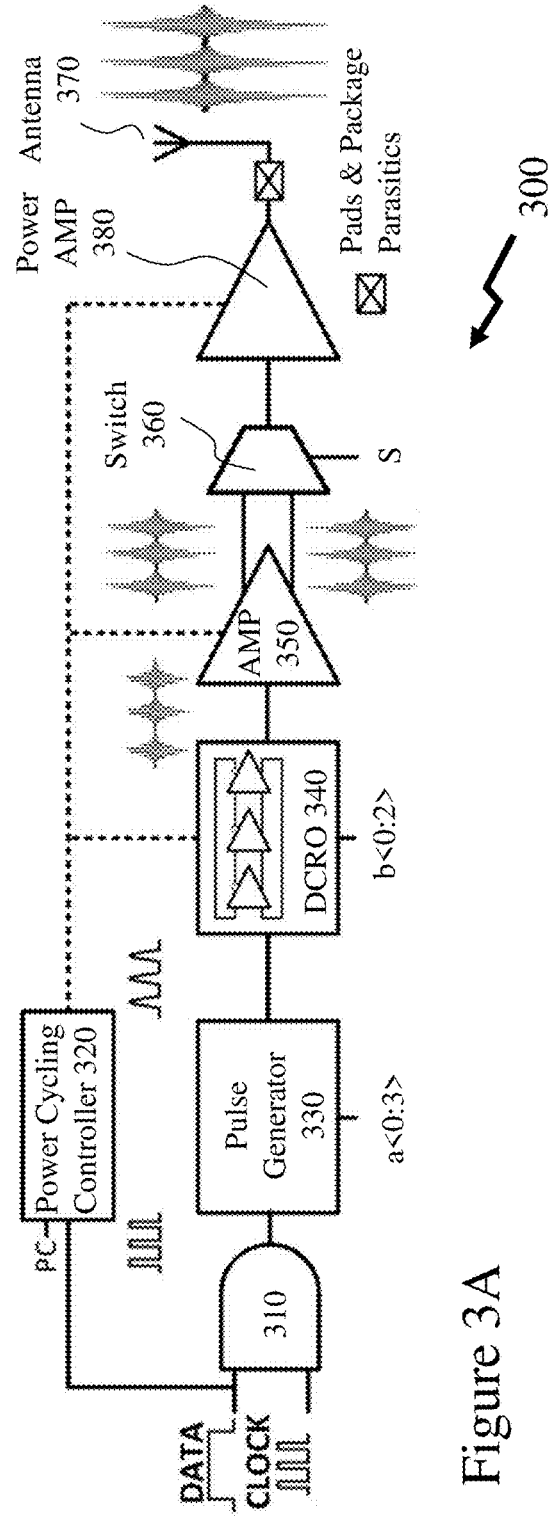
FIG. 3A depicts a block diagram of a UWB transmitter according to an embodiment of the invention supporting biphasic phase scrambling.

Now referring to FIG. 3A there is depicted schematically a block diagram 300 of an exemplary IR-UWB transmitter according to embodiments of the invention supporting biphasic phase scrambling. In comparison to the IR-UWB transmitter 200 in FIG. 2 for an IR-UWB according to embodiments of the invention without biphasic phase shifting rather than being composed of five main blocks plus the antenna the Biphasic Phase Shifting IR-UWB (BPS-IR-UWB) transmitter comprises 6 main blocks. First a programmable impulse is produced by a pulse generator 330 at clocked intervals when the data signal from AND gate 310 is high based upon control signals presented to the AND gate 310. The pulses from the pulse generator 330 are then up-converted with a programmable multi-loop digitally controlled ring oscillator (DCRO) 340. The output from the DCRO 340 is then coupled to a dual-output amplifier (VGA) 350 both in order to compensate for any frequency dependency of the pulse amplitude but also to generate dual phase shifted output signals that are coupled to a switch 360 which selects one of the two signals to couple to the output power amplifier (driver) 380 under the action of the switch control signal "S" applied to the switch 360. Note that a similar phase selection scheme could be implemented by affecting the startup conditions o DCRO 340 in order to provide the two phases. This would preclude the need for switch 360 at the cost of an added control startup condition control signal on DCRO 340.

The output power amplifier 380 feeds the antenna 370, overcoming typical package parasitics, such as arising from packaging the transceiver within a quad-flat no-leads (QFN) package. In order to reduce the power consumption of the BPS-IR-UWB transmitter represented by block diagram 300 according to an embodiment of the invention a power cycling controller 320 dynamically switches on or off these functional blocks when the data signal "PC" is low. Accordingly, a BPS-IR-UWB transmitter according to embodiments of the invention transmits pulses with or without phase shift based upon the control signal "S" applied to switch 360. If this control signal is now fed from a random data generator or a pseudo-random data generator then the resulting pulses coupled to the antenna of the BPS-IR-UWB transmitter will be pseudo-randomly or randomly phase shifted.

Figure 3B:
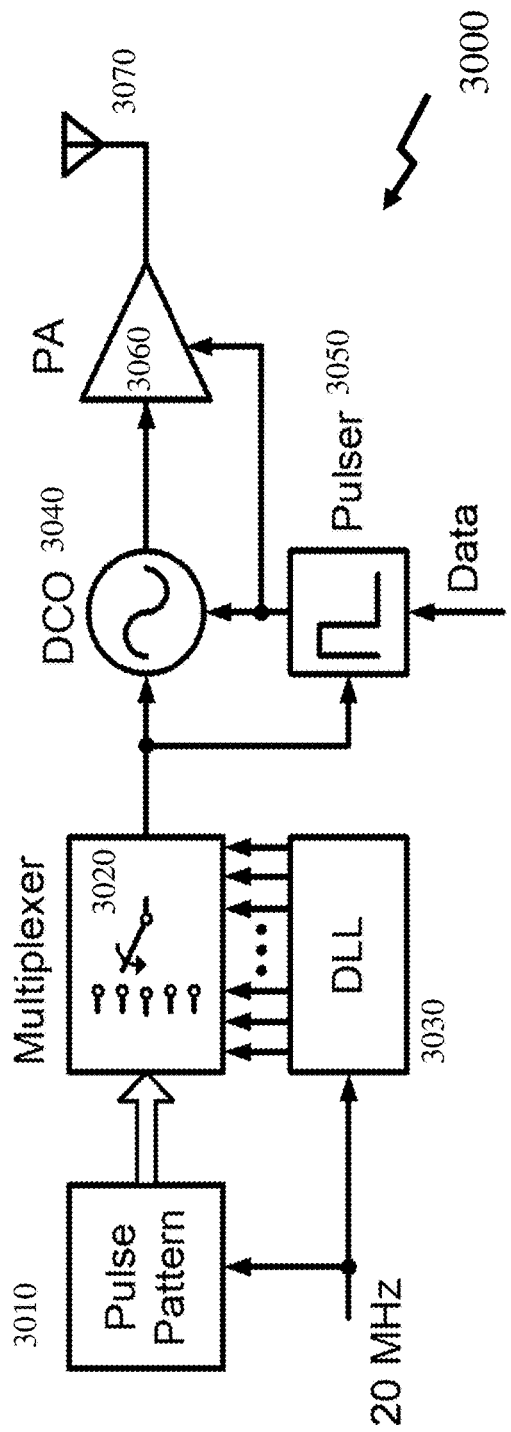
FIG. 3B depicts a block diagram of a UWB transmitter according to an embodiment of the invention employing dynamically configurable and programmable pulse sequences.

Now referring to FIG. 3B there is depicted schematically a block diagram 3000 of an exemplary IR-UWB transmitter according to embodiments of the invention. As depicted a Pulse Pattern block 3010 holds a configuration for the pulses used to represent the current symbol. From the symbol-rate clock (i.e. 20 MHz), multiple phases are generated by a Delay Locked Loop (DLL) 3030. The rising edge of each clock phase represents the start of one pulse in the symbol pulse bundle. A multiplexer 3020 is triggered by the edges of the clock phases and selects the configuration of the current pulse out of the Pulse Pattern block 3010. A pulse generator (Pulser) 3050 generates pulses with a pulse width set by the multiplexer 3020 and enables the Digitally Controlled Oscillator (DCO) 3040 and Power Amplifier (PA) 3060. When enabled, the DCO 3040 generates a Gaussian shaped pulse with frequency set by the multiplexer 3020, which is then amplified by the PA 3060 and radiated by the antenna 3070.

Accordingly, the Pulse Pattern block 3010 establishes the pulses for a symbol or sequence of symbols. In this manner updating the Pulse Pattern block 3010 adjusts the pulse sequence employed for each symbol and accordingly the Pulse Pattern block 3010 may be dynamically updated based upon one or more factors including, but not limited to, network environment data, predetermined sequence, date, time, geographic location, signal-to-noise ratio (SNR) of received signals, and regulatory mask.

Figure 3C:
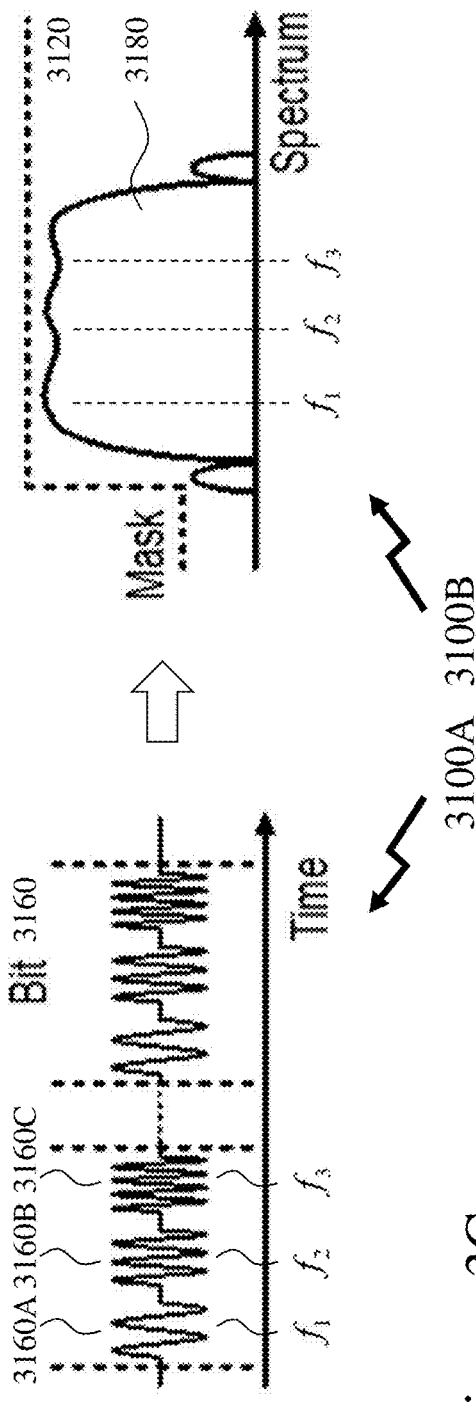
FIG. 3C depicts schematically a multi-pulse symbol UWB protocol according to an embodiment of the invention.

Referring to FIG. 3C there is depicted schematically a multi-pulse symbol UWB protocol according to an embodiment of the invention. Referring to first image 3100A there is depicted a bit 3160 comprising a series of sub-pulses 3160A to 3160C which are each at frequencies $f_1$; $f_2$; $f_3$. Accordingly, the multi-pulse spectrum 3180 of a symbol (bit 3160) is depicted in second image 3100B as obtained conceptually (phase scrambling is omitted for clarity) by summing the individual pulse spectra of the sub-pulses 3160A to 3160C, which increases the bandwidth whilst increasing the total symbol duration, in contrast with single-pulse prior art methods, whilst maintaining the maximum power below the UWB mask 3120. This allows the symbol energy to be maximized while relaxing the timing requirements and level of synchronization required at the receiver. An arbitrary number of pulses with different sets of parameters may be included within a bundle to tailor the pulse spectrum to a given requirement.

2. IR-UWB Receiver

Figure 4:
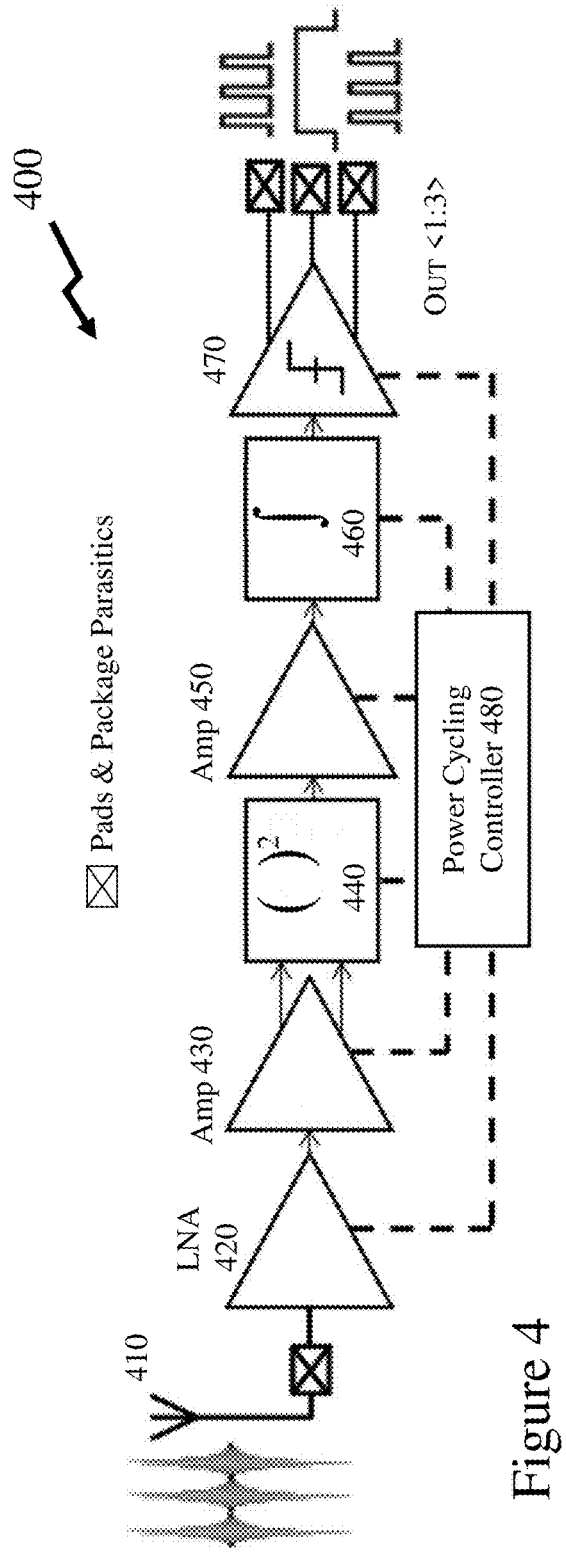
FIG. 4 depicts a block diagram of a UWB receiver according to an embodiment of the invention.

Referring to FIG. 4 there is depicted schematically the architecture of an IR-UWB receiver 400 according to embodiments of the invention. Accordingly, the signal from an IR-UWB transmitter is received via an antenna 410 and coupled to a low noise amplifier (LNA) 420 followed by first amplifier 430 wherein the resulting signal is squared by squaring circuit 440 in order to evaluate the amount of energy in the signal. The output of the squaring circuit 440 is then amplified with second amplifier 450, integrated with integration circuit 460 and evaluated by a flash ADC 470 to generate the output signals. Also depicted is Power Cycling Controller 480 which, in a similar manner to the power cycling controller 220 of IR-UWB transmitter 200 in FIG. 2, dynamically powers up and down the LNA 420, first and second amplifiers 430 and 450 respectively, squaring circuit 440, and flash ADC 470 to further reduce power consumption in dependence of the circuit's requirements.

Figure 5:
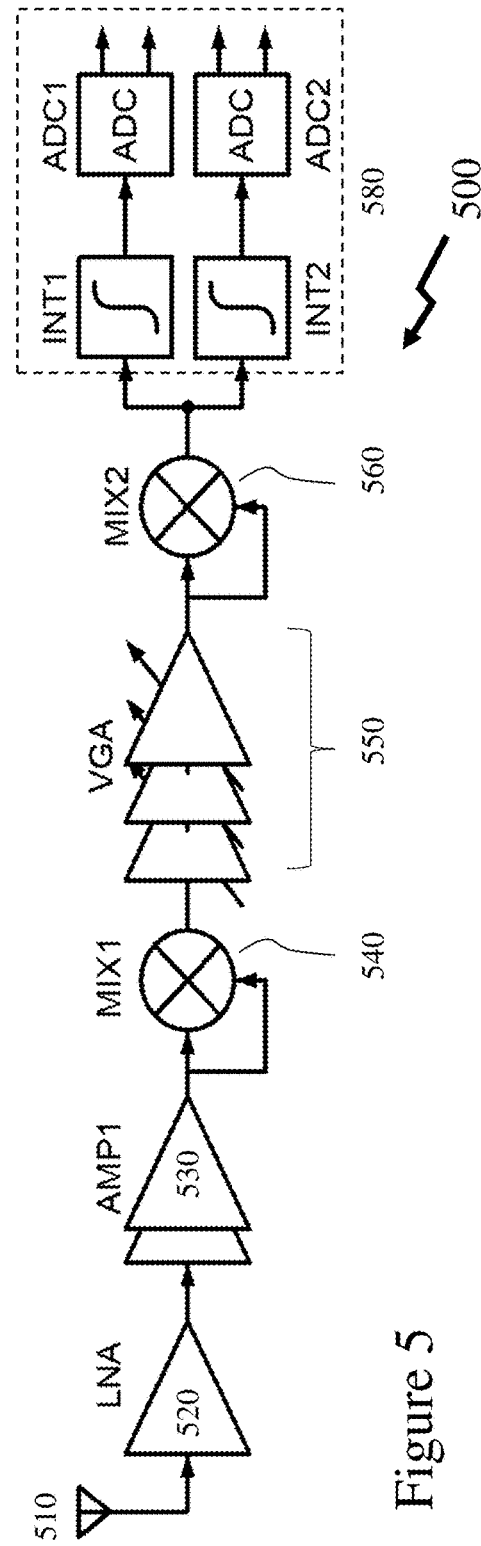
FIG. 5 depicts a receiver circuit schematic for a UWB receiver/transceiver according to an embodiment of the invention.

Referring to FIG. 5 there is depicted a schematic of a receiver 500 according to an embodiment of the invention. The RF signal from the antenna 510 is initially amplified by a Low Noise Amplifier (LNA) 520 before being passed to a two stage RF amplifier (AMP1) 530. A first squaring mixer (MIX1) 540 multiplies the signal with itself to convert to the Intermediate Frequency (IF). A three-stage Variable Gain Amplifier (VGA) 550 amplifies the signal further and implements a bandpass filter function. The VGA 550 output is then coupled to a second squaring mixer (MIX2) 560 which down-converts the signal to the baseband frequency. A parallel integrator (INT1 and INT2) sums the signal energy, which is digitized by the Analog-to-Digital Converters (ADC1 and ADC2) within a digital processor (not depicted for clarity).

3. IR-UWB Receiver

As described within WO/2019/000075 and WO 2016/191851 the inventors have established design parameters of millisecond range start-up time from sleep mode and microsecond range start-up time from idle mode by establishing a custom integrated DC/DC converter and duty cycled transceiver circuitry that enables fast circuit start-up/shut-down for optimal power consumption under low (1 kbps) and moderate data rates (10 Mbps).

Figure 6:
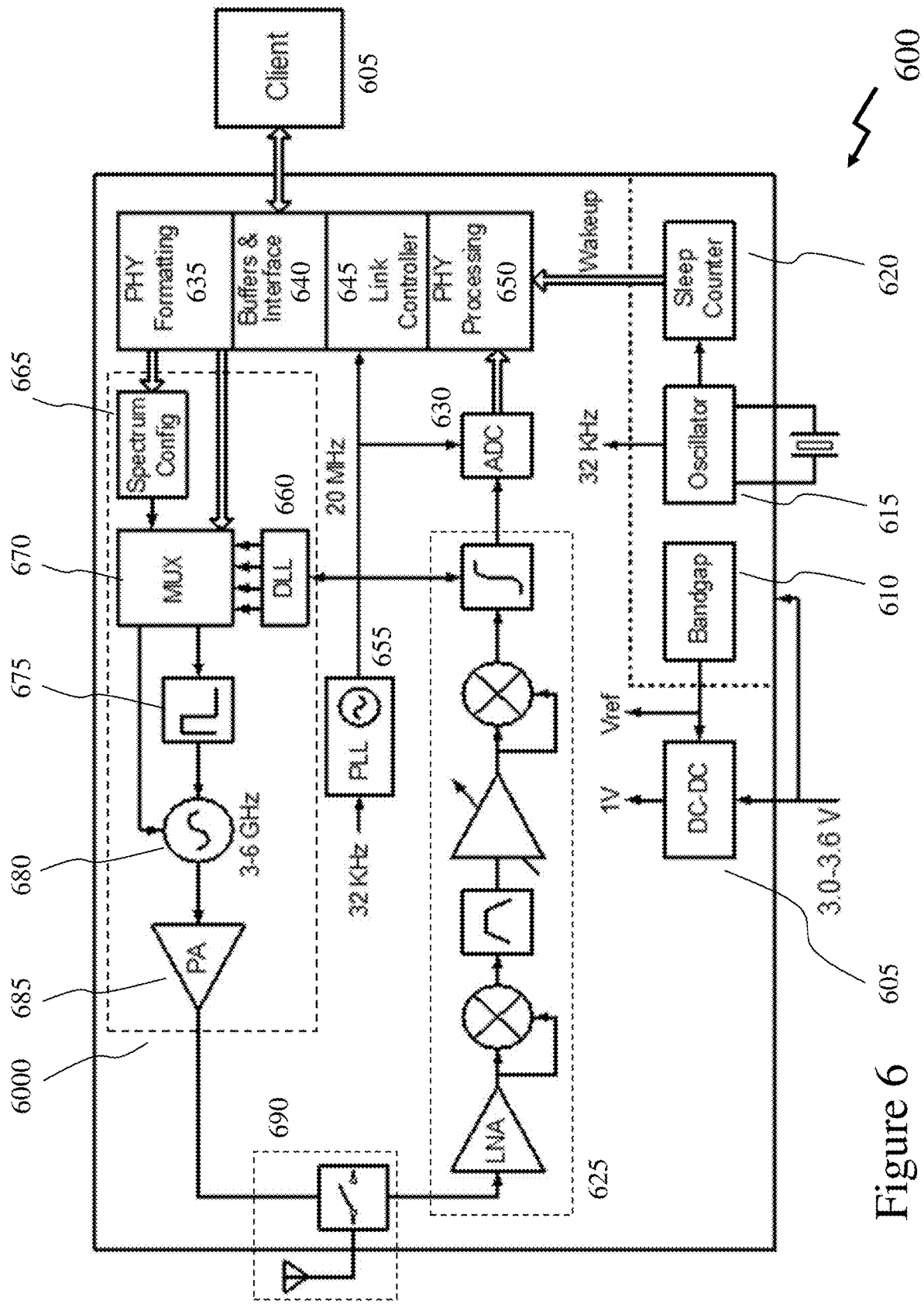
FIG. 6 depicts a circuit schematic for a UWB transceiver according to an embodiment of the invention.

In order to sustain good energy efficiency, the elements of a total UWB transceiver, such as depicted with transceiver 600 in FIG. 6 according to embodiments of the invention, has been designed for low static sleep current and fast startup/sleep times. Referring to FIG. 6, a battery (3.0 V≤$V_{BATT}$≤3.6 V) (not depicted for clarity) powers a low-frequency crystal oscillator 615, sleep counter 620 and bandgap reference 610, all of which are typically always operational although the bandgap reference 610 could be duty cycled within other embodiments of the invention without altering the scope of the claimed invention). Their power consumption limits the minimum power consumption of the system to sub-microwatt level. An integrated buck DC-DC converter 605 is powered by the battery when the system is not in sleep mode, and this provides the supply voltage to the rest of the system with high conversion efficiency. The startup time of the DC-DC converter 605 is on the order of several symbol periods in order to minimize wasted energy. Between sleep periods, the PLL 655 is active to provide the base clock for the system. The receiver 625 and DLL 660 have dedicated power down controls and are only activated during frame transmission/reception. Further, the transmitter is also power cycled through its all-digital architecture which is not depicted as having a separate control. The power consumption of the digital synthesized blocks is low due to the low base clock (e.g. 20 MHz).

In principle, a power-cycled transceiver achieves linear scaling of power consumption with data rate, thus achieving constant energy efficiency. With a fixed frame size, multiple data rates are obtained by adjusting the length of the sleep period, with the maximum attainable data rate determined by the symbol rate in the frame itself. In order to preserve energy efficiency, the power consumption during sleep must be lower than the average power consumption. For high data rates, powering down the PLL is not required when its consumption does not significantly degrade the overall efficiency. For low data rates, the whole system except the bandgap reference, crystal oscillator, and sleep counter can be shut down during sleep mode. In this case, the millisecond range startup time of the PLL can be insignificant compared to the sleep period, and overall efficiency is also not significantly degraded.

As depicted the UWB transceiver 600 also comprises a receive/transmit switch 690 coupled to the antenna to selectively couple the transmitter 6000 or receiver 625 to the antenna during transmission and receipt respectively. The UWB transceiver 600 also comprises a spectrum configuration circuit 665 (equivalent to Pulse Pattern 3010 in transmitter 3000 in FIG. 3B), PHY Processing circuit 650, Link Controller 645, Buffer and Interface circuit 640, and PHY Formatting circuit 635. The UWB transceiver 600 communicates via Link Controller 645 to the Client 605. As such, Link Controller 645 may communicate using a wired protocol to Client 605, for example.

4. Uncertain IF Receiver for UWB Receivers

Figure 7A:
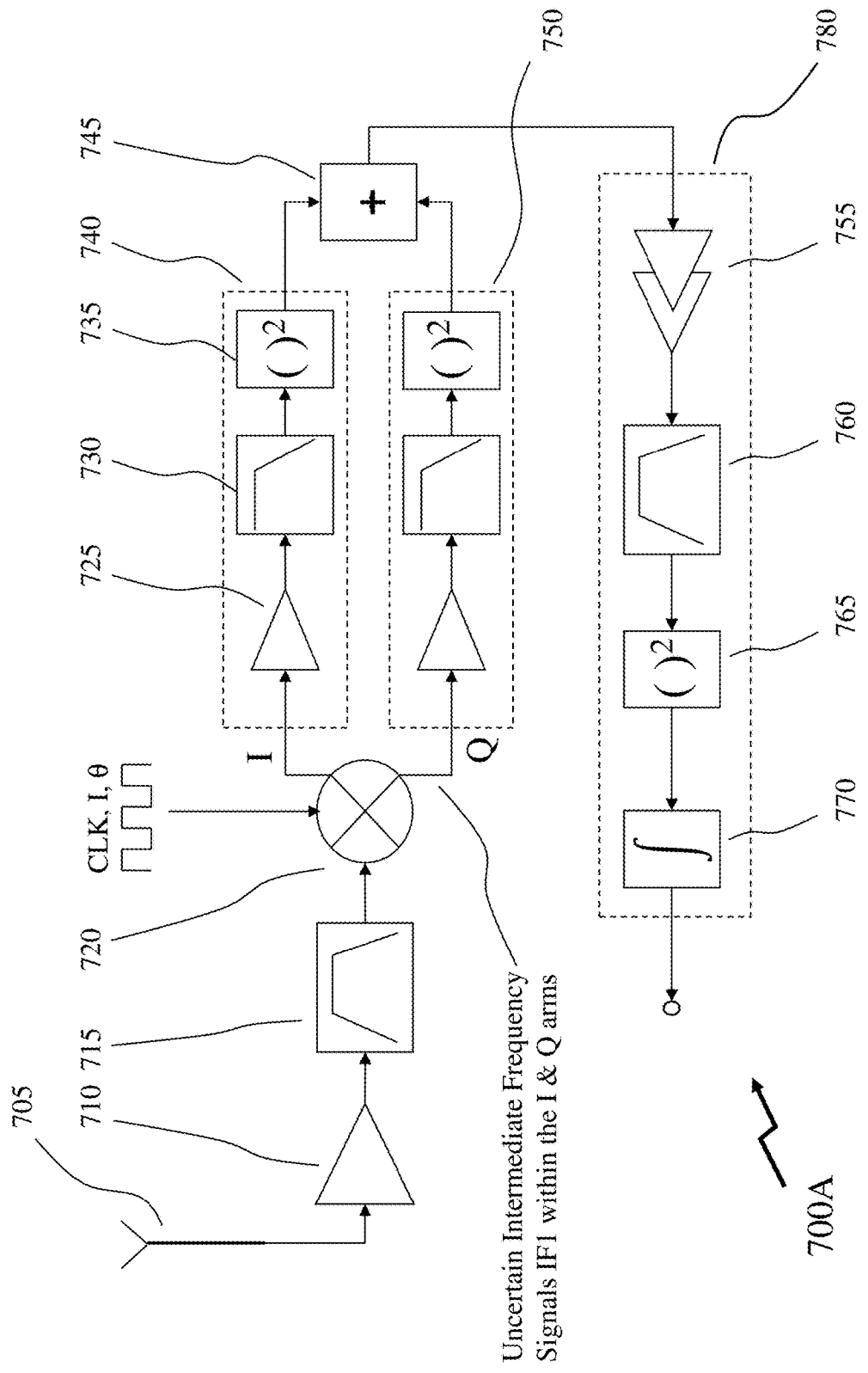
FIG. 7A depicts a circuit schematic of a UWB receiver according to an embodiment of the invention.

Referring to FIG. 7A there is depicted a UWB receiver 700A according to an embodiment of the invention allowing the UWB receiver 700A to detect pulses received by an antenna 705 which have been transmitted by a transmitter according to an embodiment of the invention. Accordingly, the antenna receives a pulsed UWB signal, which consists of a carrier signal that is pulsed according to a fast envelope, for example with ±2 ns pulse width. This received signal is coupled initially to a Low Noise Amplifier (LNA) 710 which amplifies the signal wherein the amplified signal is bandpass filtered by first filter 715 to suppress out-of-band interferers. Optionally, other amplifiers can be present at this RF stage prior to mixer 720. First filter 715 may, for example, be a bandpass filter. Optionally, LNA 710 and first filter 715 may be a tunable LNA to perform filtering to a sub-band (or sub-bands) currently in use in order to improve noise performance.

Next, an in-phase quadrature mixer 720 multiplies the received filtered and amplified signal with a square clock, thus down converting the pulses to an uncertain intermediate frequency, IF1, where the IF1 frequency is the difference between the pulse carrier frequency and the clock frequency. As the UWB receiver 700A is an energy receiver the paths in quadrature are required (90 degrees out of phase) such that the total energy of the pulse is preserved where the in-phase, I, and quadrature signals, Q, are split between the two paths in accordance with the phase difference between RF signal and clock. Even if UWB Receiver 700A was not an energy receiver both paths would be required to avoid the scenario of using a single path, either I or Q, and the received RF signal and clock being out of phase to yield no signal in the single path.

The IF1 signals within the I and Q arms are processed by first and second signal processing circuits 740 and 750 respectively. Each of these comprises an amplifier 725 such that the mixed and down converted IF1 signals are amplified and these are then filtered by a second filter 730, for example a sharp low pass or bandpass filter, which is established in dependence upon a UWB band. Within embodiments of the invention the UWB may be a full band or a predetermined portion of a wider band. For example, considering the ISM band according to FCC regulations then the full band may be 3.1 GHz to 10.6 GHz or it may be a predetermined portion thereof. Optionally, within some embodiments of the invention the transmitter may cycle through a plurality of sub-bands of the band according to a sequence, where a sub-band may for example be 500 MHz where the cyclic sequence is a defined number of sub-bands, e.g. 4, 8, 16 or another integer number, within the overall band, e.g. the FCC regulated unlicensed frequency band between 3.1 GHz and 10.6 GHz. Accordingly, the receiver either employs filters having bandwidths covering the full band or a sub-band. When the filter bandwidths are a sub-band then the transmitter may communicate an initial sequence within a synchronization process and update the sequence in the preamble to align the receiver to the transmitter. Optionally, the filters may be reconfigurable filters employing N-path techniques or other re-configurable filtering techniques.

This method according to embodiments of the invention allows for multiple UWB signals within a sequence of defined sub-bands within an overall wider bands such that the receiver is operating upon a small bandwidth rather than the full bandwidth over which the transmitter and receiver can operate. Accordingly, in embodiments of the invention the filters dynamically set or selected according to the band sequence. Alternatively, in other embodiments of the invention exploiting non-banded transmitters and receivers the second filter 730 may be established to pass the full down converted bandwidth.

The output of each second filter 730 is then squared by a squaring operation performed by first squarer 735 in order to extract the instantaneous power on that path. The outputs from the first and second signal processing circuits 740 and 750 respectively are summed into the total instantaneous power by summation circuit 745. The output of the summation circuit 745 is then coupled to an amplification stage 755. This amplified signal is then filtered by third filter 760, squared by a squaring operation performed by second squarer 765 and then integrated with integrator 770. The amplification stage 755, third filter 760, second squarer 765 and integrator 770 forming a third signal processing circuit 780.

The signal from summation circuit 745 follows the envelope of the pulse signal with the RF carrier removed. Accordingly, without knowing the exact pulse carrier frequency, it is still possible to receive the signal whilst applying sharp filtering. The amplification within each of the first and second signal processing circuits 740 and 750 together with that of the third signal processing circuit 780 may be fixed gain amplifiers or variable gain amplifiers. In embodiments of the invention where variable gain is employed then this can be employed to amplify the signal to full strength which in conjunction with the bandpass filtering allows removal of narrowband interfering signals.

Figure 7B:
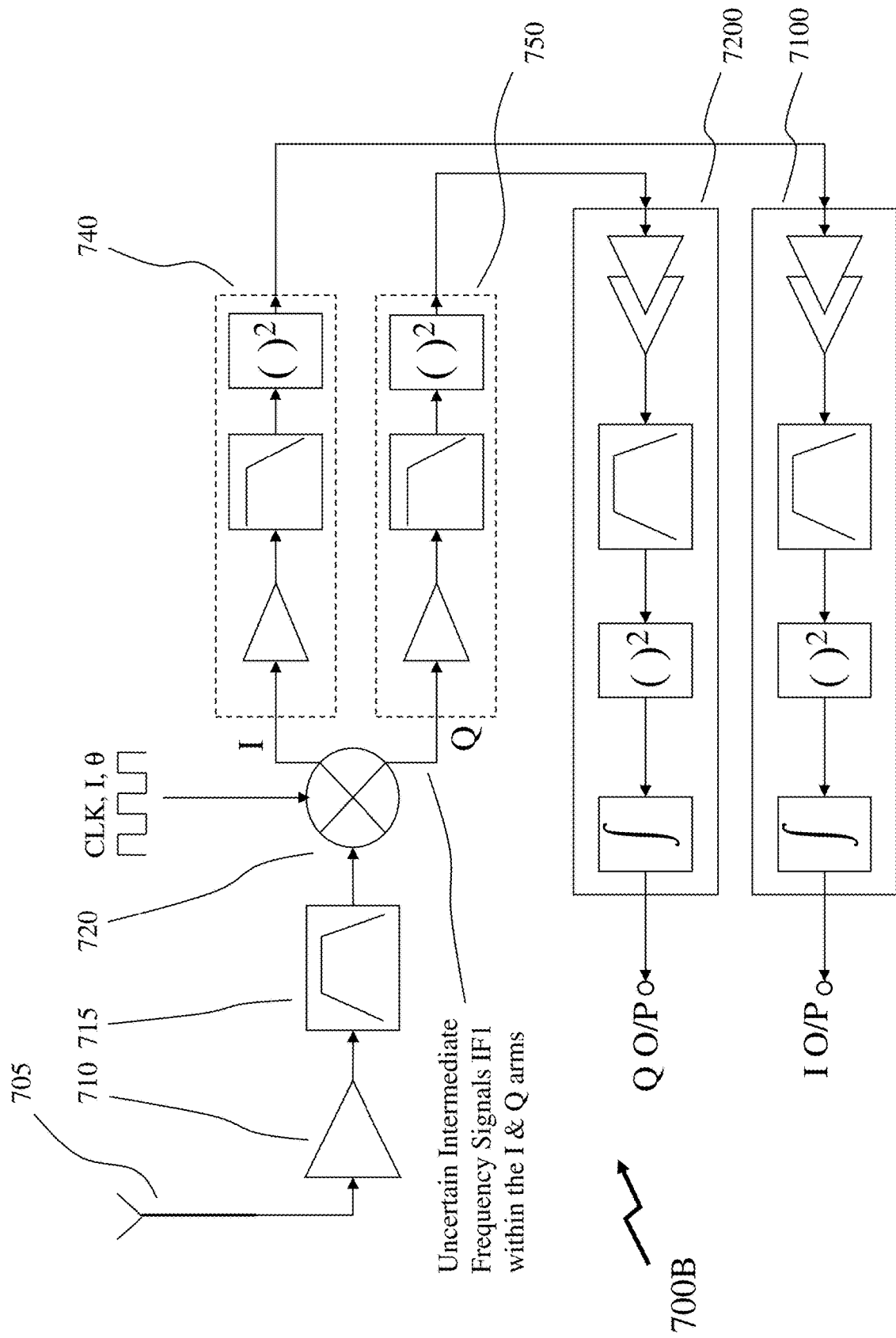
FIG. 7B depicts a circuit schematic of a UWB receiver according to an embodiment of the invention.

Now referring to FIG. 7B there is depicted a UWB receiver 700B according to an embodiment of the invention. Wireless signals received at the antenna 705 are coupled initially to a Low Noise Amplifier 710 which amplifies the signal wherein the amplified signal is bandpass filtered by first filter 715 to suppress out-of-band interferers. Optionally, other amplifiers can be present at this RF stage prior to mixer 720. First filter 715 may, for example, be a bandpass filter.

Next, an in-phase quadrature mixer 720 multiplies the received filtered and amplified signal with a square clock, thus down converting the pulses to an uncertain intermediate frequency, IF1, where the IF1 frequency is the difference between the pulse carrier frequency and the clock frequency. As with UWB receiver 700A the I and Q outputs from the mixer 720 are coupled to first and second signal processing circuits 740 and 750 respectively but rather than being summed the outputs of the first and second signal processing circuits 740 and 750 respectively are coupled to the third and fourth signal processing circuits 7100 and 7200 respectively. The I O/P and Q O/P outputs from the third and fourth signal processing circuits 7100 and 7200 respectively may then be coupled directly to one or more digital processing circuits prior to being summed to generate the total power and perform the decision making. Optionally, these outputs may be summed and then converted to digital signals.

5. Encoded Bundle Pulse Modulation (EBPM) Coding Schemes

Measures of merit for a wireless link exploiting wireless radios according to embodiments of the invention are channel bandwidth efficiency (which is tightly correlated to energy efficiency), spectral efficiency and link robustness. Channel bandwidth efficiency is achieved by minimizing the number of symbol periods required to exchange a given amount of information which also translates into a faster and lower latency link Optimizing spectral efficiency allows for the transmission of more information for a given amount of electromagnetic radiation for which there are regulatory limits globally and there is always a compromise between data rate and link margin (robustness) for the wireless radio because of these regulatory limits. The less pulses ('1's after encoding) per bit of information there are (with the worst possible pattern of data), the better the spectral efficiency Link robustness is effectively determined by the signal-to-noise ratio (SNR), resiliency to interferences and correlates with the Hamming distance between each symbol of the modulation coding scheme.

On/Off Keying (OOK) is a prior art modulation format exploiting a direct translation of bit of information to a pulse bundle (1=pulses, 0=no pulses). The inventors have also established what they refer to as "Invertible" OOK or I-OOK which exploits the fact that the regulatory limits on spectral emissions apply on the data pattern that causes the maximum possible amount of emitted wireless radiation. For regular OOK, that pattern is "11111 . . . " which causes one pulse to be emitted per bit of information. However, for all patterns of data for which there is more "1"s than "0" s, then if the pattern is entirely bit-flipped the amount of emitted wireless radiation is reduced. Now, with the addition of a single bit in addition to the data bits then the receiver knows whether the pattern was flipped or not by the transmitter. In this manner the I-OOK encoding scheme has twice the spectral efficiency for no degradation in link robustness and almost no loss in bandwidth and energy efficiency, with the exception of an extra header field.

It would be evident that whilst the discussion above and below in respect of binary data comprising "1"s and "0"s the method is applicable to other systems wherein the decision is made as to whether a symbol or a set of symbols requiring increased wireless emission relative to another symbol or set of symbols exceeds a threshold wherein once that threshold is exceeded then the data to be transmitted is inverted.

Pulse Position Modulation (PPM) is a form of signal modulation in which M message bits are encoded by transmitting a single pulse in one of $2^M$ possible time shifts. Accordingly, 1-bit PPM is a simple differential encoding of bits into a pair of time slots (symbol periods) where the energy integrated in one time slot is subtracted relative to the other. Whilst this means double the energy and bandwidth is employed the Hamming distance per bit is also doubled. It is called PPM because it works in a very similar way to one (the position of the pulse bundle dictates the bit of information) except it is entirely managed digitally. Extending this to a 2-bit PPM encoding scheme uses two bits of information to define the position of one pulse bundle between four time slots (symbol periods). This encoding scheme offers twice the spectral efficiency and the same bandwidth efficiency for a marginal loss in link robustness in practice over 1-bit PPM. This can be extended to 4-bit PPM wherein one pulse (bundle) is located somewhere within 16 possible pulse positions.

2-bit PPM distributes only one set of pulses over 4 symbol clock periods to encode 2-bits of information in 4 pulse positions. For example, data bits "11 01" become "0010 0100" where 2 sets of pulses are employed for 4 bits but requires 8 clock cycles to perform. Accordingly, in four clock cycles there are only 4 possible combinations instead of 16 with OOK. The result is double the energy consumption of OOK, double the channel bandwidth occupied, and double the latency. This becomes exponentially worse as the number of bits per symbol increases.

The inventors have established what they refer to as Encoded Bundle Pulse Modulation (EBPM) to alleviate the energy and bandwidth burden of 2-bit PPM for the same spectral efficiency. By positioning two sets of pulses within each bundle window instead of one set of pulses the inventors can greatly increase the number of possible combinations such that more bits can be represented. With two separate 2-bit windows then patterns like "1010 0000" are invalid. However, with the novel encoding scheme of the inventors with double pulses merged such windows lead to more combinations. This can be generalized as given by Equation (1) where n is the effective number of bits per symbol, p is the number of pulse positions, and $b_0$ and $b_1$ are the respective number of empty (0) and occupied (1) pulse positions.

$$n = \log_2 \frac{p!}{b_0! \times b_1!} \tag{1}$$

According, considering 2-bit PPM then as given by Equation (2) the ratio of the number of bits per symbol over the number of pulse positions, a bit-per-pulse ratio of 2 is $\frac{2}{4}=0.5$. For 2-pulse 4-bit EBPM (referred to as 4-bit Double EBPM by the inventors) for the same number of pulses and pulse positions we get more than 4 bits of information. The inventors have also considered whether the 2 pulse 4-bit PPM symbol can fit into 6 pulse positions rather than 8.

$$n = \log_2 \frac{p!}{b_0! \times b_1!} = \log_2 \frac{4!}{2! \times 1!} = 2 \quad (2)$$

$$n = \log_2 \frac{p!}{b_0! \times b_1!} = \log_2 \frac{8!}{6! \times 2!} = 4.807 \quad (3)$$

Referring to FIG. 8 there is depicted an example of a 4-bit Double EBPM encoding scheme according to an embodiment of the invention with a minimum Hamming distance of 2.

Figure 9:
FIG. 9 depicts a comparison of prior art encoding schemes and new encoding schemes according to embodiments of the invention.
Figure 9:
Figure 9:
Figure 9:
Figure 9:
Figure 9:

Now referring to FIG. 9 there is depicted a comparison of prior art encoding schemes, these being OOK, 1-bit PPM, 2-bit PPM and 4-bit PPM, with the new encoding schemes according to embodiments of the invention, namely 4-bit Double EBPM and Invertible OOK. The assumptions for energy/bit were that the transmitter energy cost is independent of packet data. The link robustness is qualitatively estimated based upon Hamming distance, number of bits affected, etc. As noted above, Invertible OOK requires some simple packet pre-processing.

Referring to FIG. 10 there is depicted a 5-bit Double EBPM encoding scheme yielding 1.6 nJ/bit using the same analysis parameters as employed in calculating the data in FIG. 9 and achieves 2.5 bit/pulse transmission. The encoding scheme presented is not necessarily an optimal encoding scheme as some signaling configurations may be more vulnerable to noise-induced bit errors where there are significant number of 0s such as encoded patterns "01000000", "00100000", "0001000", "00001000", and "10000000."

Accordingly, 4-bit Double EBPM supports operating in wireless emission constrained applications. Essentially, with the constraints on the average power imposed by regulatory bodies, there is a maximum number of "pulse bundles" that can be sent every millisecond. Accordingly, 4-bit Double EBPM allows for more data to be sent for the same amount of emitted "pulse bundles" (or energy) compared to OOK and 1-bit PPM. It would be evident to one of skill in the art that the concept can be extended to N as one can increase the order of the PPM to extend the concept.

6. PLL Drift and Digital Phase Tracking

6A PLL Drift

Within the receivers described by the inventors in WO/2019/000075 and WO 2016/191851 a single integration window was described as being selected from multiple integration windows, described as 4, which was then "locked", for example when a synchronization word is detected. By "locked" the inventors means that the selection (or choice) between the multiple integration windows is locked (maintained) when no phase tracking is performed However, offsets in the underlying clock applied to the phase locked loop (PLL) result in gradual phase drifting of the receiver system. Accordingly, the optimum integration window can shift, for example during the receipt of long packets or with infrequent synchronization of the receiver to the transmitter. Accordingly, the inventors have established observing adjacent windows during receipt of the packet after synchronization in order to allow the integration window employed to follow this drift.

With respect to the receiver circuit then the additional elements include:

accumulators for a running average of '1's and '0's of the current window and the two adjacent ones;

management logic to keep track of how many '1's and '0's were integrated in the average; and a clock pulse controller to manage transitions between the first phase of one clock cycle and a last phase of the same clock cycle.

The clock pulse controller manages therefore where the transmitter runs slightly faster or slower than the receiver. For example, where the transmitter runs slightly faster than the receiver then the receiver might have to process two symbols/timeslots within one clock period which therefore requires that an additional clock pulse is inserted. In this scenario the first clock pulse takes care of the first ADC value (first integration window) and the second clock pulse the last integration window.

Optionally, the additional elements may also include decision threshold update logic using outputs from the aforementioned accumulators.

Figure 11:
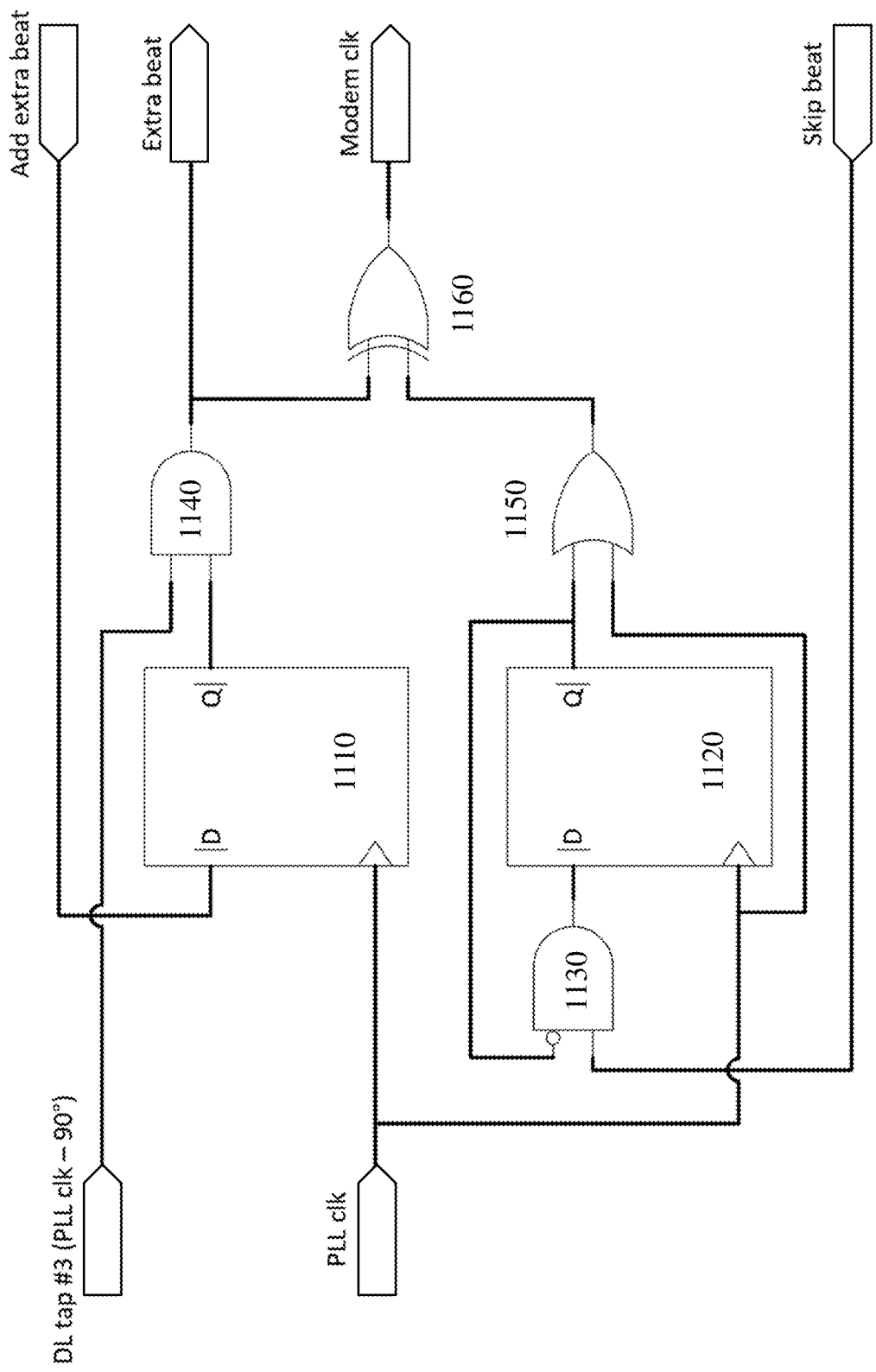
FIG. 11 depicts a schematic circuit of a clock pulse controller according to an embodiment of the invention.

Now referring to FIG. 11 there is depicted a schematic circuit of a clock pulse controller according to an embodiment of the invention. As depicted the clock pulse controller receives the PLL clock and a tapped delay line copy of the PLL clock having 90° phase offset relative to the PLL clock. However, where there is no duty cycle constraint of the output clock signal then the delay lines does not need to be tapped as "any" delay will do. By "any" the inventors mean that it is much less than half a clock cycle but long enough, e.g. 2-3 ns. 90° phase offset is required only to maintain 50% of the clock duty cycle.

The PLL clock is coupled to first and second D-type flip-flops 1110 and 1120 respectively. The Q output of the second D-type flip-flop 1120 is combined with the PLL clock by OR gate 1150 as well as being coupled back to an inverted input of a first AND gate 1130, the output of which is coupled to the D input of the second D-type flip-flop 1120. The other input of AND gate 1130 being coupled to what the inventors refer to as "skip beat" signal. The output of the first D-type flip-flop 1110 is combined via a second AND gate 1140 together with the 90° phase offset copy of the PLL clock. The outputs of the OR gate 1150 and second AND gate 1140 providing the inputs to an Exclusive NOR 1160 to provide what the inventors refer to as a "modem clock" signal. The output of the second AND gate also provides what the inventors refer to as an "extra beat" signal. The D input of the first D-type flip-flop 1110 is coupled to a signal the inventors refer to as "add extra beat." Optionally, AND gate 1130 may be omitted but has been included within the embodiment of the invention depicted in FIG. 11 to ensure that the wireless radio employing the circuit does not get "stuck" with all of its clock edges suppressed.

Accordingly, the "modem clock" is the clock signal provided to the rest of the digital circuitry. The "skip beat" signal eliminates a clock edge in the cases where the remote transmitter is too slow. The "add extra beat" signal inserts an extra clock pulse in the cases where the remote transmitter is too fast and forces the receiver to take two symbols within one clock cycle. The "extra beat" signal tells the modem which of the rising edges is produced by the extra pulse (which also defines when to change integration window selection).

It would be evident that the clock pulse controller is a simple and small logic circuit to address the issues discussed above. Beneficially, it does not impact currently established logic within a wireless modem in the modem significantly to accommodate skipping a beat or processing two symbols at once as the altered clock signal already does it. With respect to the accumulators for generating the running averages of the current window and the two adjacent ones then there is already a per-window accumulator used in window selection that is unused after window selection is done as it is only used before the synchronization word is received. Accordingly, these accumulators already exist within the logic of the modem for preamble detection and analysis purposes.

Whilst the embodiment of the invention described in respect of FIGS. 10 and 11 relates to a clock source within a wireless radio exploiting a PLL clock it would be evident that the concept is applicable to any symbol clock employed to provide the outlined functionality.

6B. Digital Phase Tracking

Figure 12:
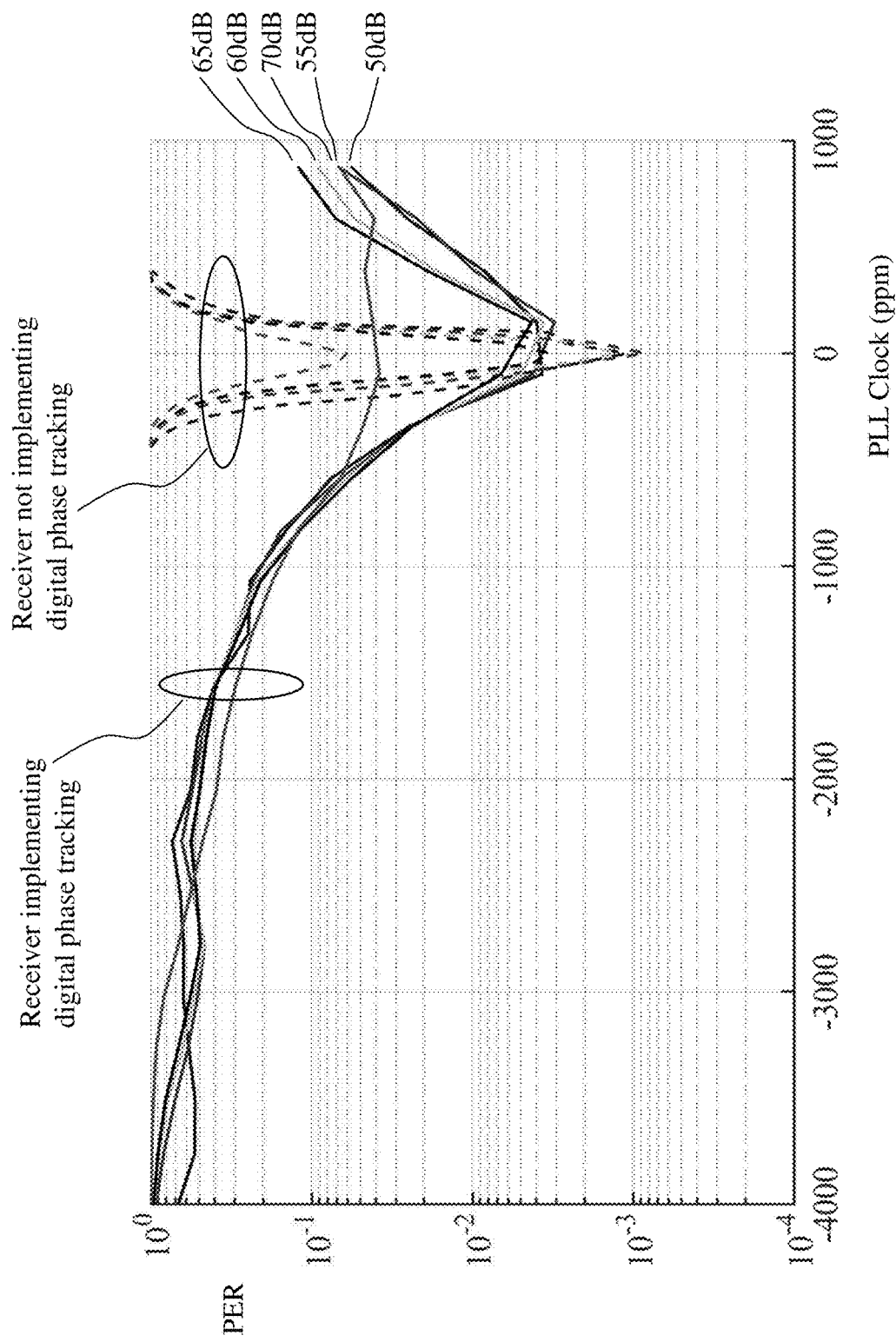
FIG. 12 depicts the tolerance to clock drift for UWB receivers with and without digital phase tracking according to an embodiment of the invention.

Within the receivers described by the inventors in WO/2019/000075 and WO 2016/191851 the receiver is synchronized to the transmitter during an initial "configuration" phase. However, it would be beneficial to track subsequent clock drift between the transmitter and receiver provided. The assumption is that the drift is slow and predictable enough. Accordingly, the phase tracking methodology established by the inventors allows the receiver to decide when to switch between integration windows and change the bit decision threshold to keep receiving the drifting signal during a packet reception. FIG. 12 depicts the tolerance to clock drift for both the standard receiver, not implementing a method of digital phase tracking according to an embodiment of the invention, and a receiver implementing a method of digital phase tracking according to an embodiment of the invention. This method can also relax timing requirements for the system, enabling lower power and lower cost timing circuitry to be used (e.g. low cost 32 kHZ quartz crystal).

FIG. 12 depicts allowable clock drift in parts per million (ppm) for a UWB receiver when receiving packets with 528 bits of payload. Each dotted line is the dropped (or missing) packet rate for a fixed channel attenuation as a function of the frequency offset between a transmitter and a receiver's symbol clock expressed in parts-per-million when phase tracking is disabled, meaning the receiver picks the same integration window for all symbols of the same packet at the beginning, assumes the signal will stay aligned with this window and pays no attention to adjacent integration windows. Continuous lines are the same conditions with phase tracking enabled where we can see that the region of tolerance to clock drifting roughly quadruples below the 10% packet error rate mark.

The digital phase tracking exploits a phase tracking algorithm which tracks signal drifts by subtracting the analog-to-digital converter (ADC) code values of the 16 last '0's (vacant pulse slots) from the ADC code values of the 16 last '1's for a given integration window. The algorithm does this for the currently chosen integration window from which the packet is decoded as well as for its two adjacent integration windows. This produces the latest averaged difference between the energy levels of '1's and '0's (a coarse metric of SNR) for the current integration window together with the window leading and the window lagging. For embodiments of the receiver such as described in WO/2019/000075 and WO 2016/191851 and the clock rates etc. described within these then the leading window is leading by approximately 12 ns and the one lagging behind lags by approximately 12 ns. The algorithm by comparing these SNR figures can establish that the current integration window it is using to decode the packet is no longer optimal and decide to continue decoding the incoming packet from another integration window. If the device transmitting the packet has a local symbol clock running slightly slower than the receiver's clock for which the packet is destined to, the more the receiver keeps decoding the packet from the same integration window, the more will the received signal be strong through the integration window lagging the one currently used by the receiver. The same happens to the integration window leading the one being used by the decoder if the transmitter's clock runs faster.

It would be evident that within the embodiments of the invention that the integration windows whilst being described as "lagging" or "leading" with respect to other integration windows may or may not overlap portions of other integration windows. Optionally, within another embodiment of the invention the phase tracking algorithm may ignore the ADC code values of the 16 last '0's (vacant pulse slots).

In order to account for the need to skip a symbol clock or to add one respectively, a clock controller allows the receiver to jump from the last integration window to the first or from the first to the last. In the former case which can happen when the transmitter's clock runs slower, the clock controller will suppress one clock pulse of the symbol clock to pause the receiver's modem for one symbol period to keep it synchronized within one symbol clock cycle with the transmitter. In the latter case, an extra clock pulse is inserted to make the receiver's modem process two symbols within one symbol clock cycle so that the receiver catches up to the transmitter. It would be evident that the controller to achieve this is similar to the one described above in respect of FIG. 11 and PLL drift except that now the signals "add extra beat" and "skip beat" are now generated by the digital decision circuitry implementing the digital phase tracking algorithm which uses the ADC values from the 16 last '0's (vacant pulse slots) and 16 last '1's for the current integration window and the integration windows leading and lagging.

Accordingly, it would be evident that the digital phase tracking may be implemented with:
 digital accumulators for summing ADC values of last 16 '1's and last 16 '0's of the current window and the two adjacent ones;
 management logic to manage storing ADC values to the digital accumulators and counting received '1's and '0's to stop adding until both accumulated 16 counts and then reset;
 decision threshold update logic using outputs from the aforementioned accumulators; and
 the clock pulse controller to manage changes in phase selection between the first and last phase.

Whilst the embodiments of the invention have been described with respect to 16 "1"s and 16 "0"s it would be evident to one of skill in the art that the number of bits for which ADC values are digitally accumulated may vary within other embodiments of the invention. Optionally, the number of bits accumulated may be dynamically set by a receiver controller in dependence upon one or more factors including, but not limited to, packet size, established rate of clock drift from shifting integration windows, and a measure of the overall signal SNR.

7. RTT Ranging Algorithm

Amongst the beneficial features and/or applications of UWB devices would be an ultra-low power RF ranging device. Within WO 2016/191851 the inventors have presented a couple of ranging concepts based upon time of flight information established by a first device in dependence upon a signal sent to a second device from which an echo back signal received, known as Round-Trip Time (RTT) ranging.

With this idea, it is possible to implement coarse ranging capability with ultra-low power UWB devices such as described by the inventors previously which are optimized for digital communication. Traditional Round-Trip Time (RTT) ranging devices operate by time-accurate echoing from one node (device) of the ranging signal exchange. Within this one node (device) sends the ranging signal that the other node must echo as soon as it receives it and especially with as predictable and accurate as the echoing delay can be and the first node use the delay between the instant it sends the ranging signal and the instant it receives the echo to compute what is the distance between the two communicating nodes. Thus, the echo delay has to be very accurately fixed and usually, the echoing node runs on a fast sampling clock to allow it to have a finer time granularity to decide when to send back the echo. With this finer granularity, the echoing delay varies less which allows the first node who sent the incidental signal to get a more accurate measure of the distance between it and the echoing node. The slower the sampling clock, the more inaccurate the ranging devices will be.

As noted in WO/2019/000075 and WO 2016/191851 the UWB devices operate with a base symbol clock of only 20.48 MHz so accurate echoing delay is impossible. To overcome this, the ability to evaluate the time at which a pulse is received with the energy accumulated through the integration windows can be used to reach a coarse but still useful time-of-flight ranging capability. Instead of trying to repeat the signal with a precise echoing delay, the echoing node can measure what is the phase of the incidental signal it receives relative to its symbol clock, the same clock with which it launches the echo, and therefore it knows what its own echoing delay is for any given ranging signal despite not being able to correct it. Accordingly, the echoing node can communicate to its peer what was its echoing delay (through phase information) so that the peer subtracts the delay error to get a much more accurate measure of the distance between the two nodes than a 20 MHz symbol clock would normally enable.

Considering initially the granularity of a transceiver according to the embodiments of the invention within WO/2019/000075 and WO 2016/191851 then we find the following:

Symbol/PLL period time=48.8 ns (14.64 m/48.03 feet); and
Receiver's integration window=12.2 ns (3.66 m/12 feet); and
Pulse repetition rate=~4 ns (1.2 m/3.94 feet); and
Phase of pulse=~0.1 ns (0.03 m/0.1 feet).

With respect to control/detectability then we find the following:

Symbol/PLL period time can be established through timers/counters;
Receiver's integration window is detectable only;
Pulse repetition rate is controllable through a transmitter pattern register; and
Phase of pulse has no control/detection.

Considering base time resolution then this is ~4 ns on the transmitter side and ~12.2 ns on the receiver side. However, the distribution of energy between integration windows can give improved accuracy rather than just picking the window with the highest energy. The gain in precision is dependent upon:

ADC resolution (quantization noise);
averaging (EM noise);
echoing imprecision; and
clock drift.

When considering traditional time of flight ranging techniques then these are based upon a Time of Arrival (ToA) or Round-Trip-Time (RTT) technique. The former ToA technique requires an absolute time reference, for example provided by a global positioning signal from a global positioning system (GPS) which increases complexity as a GPS receiver must be integrated or requires strict synchronization. Due to the design of the inventor's wireless radios then this is not an option with 48.8 ns of master clock plus jitter. With the latter RTT technique a ranging signal is echoed by a remote (slave) transceiver which eliminates the need for an absolute time reference or synchronization but requires that the time delay in the remote transceiver is constant and deterministic as possible.

Accordingly, to echo a signal within wireless radios according to embodiments of the invention and those previously disclosed by the inventors with low frequency master clocks then it is necessary to compute the relative phase of the signal with the PLL clock (with integration windows) and reply back to the master the ranging signal with pulse positions that match the phase, thereby changing the transmitted pattern to include a value. This raises several issues as the echo alone introduces a delay uncertainty of ±2 ns which is the transmitter pattern resolution, any bit corruption will mean a phase cannot be reproduced and the use of a delay line to provide intermediate timing generally has poor accuracy.

7A. Alternate Ranging Scheme

Figure 13:
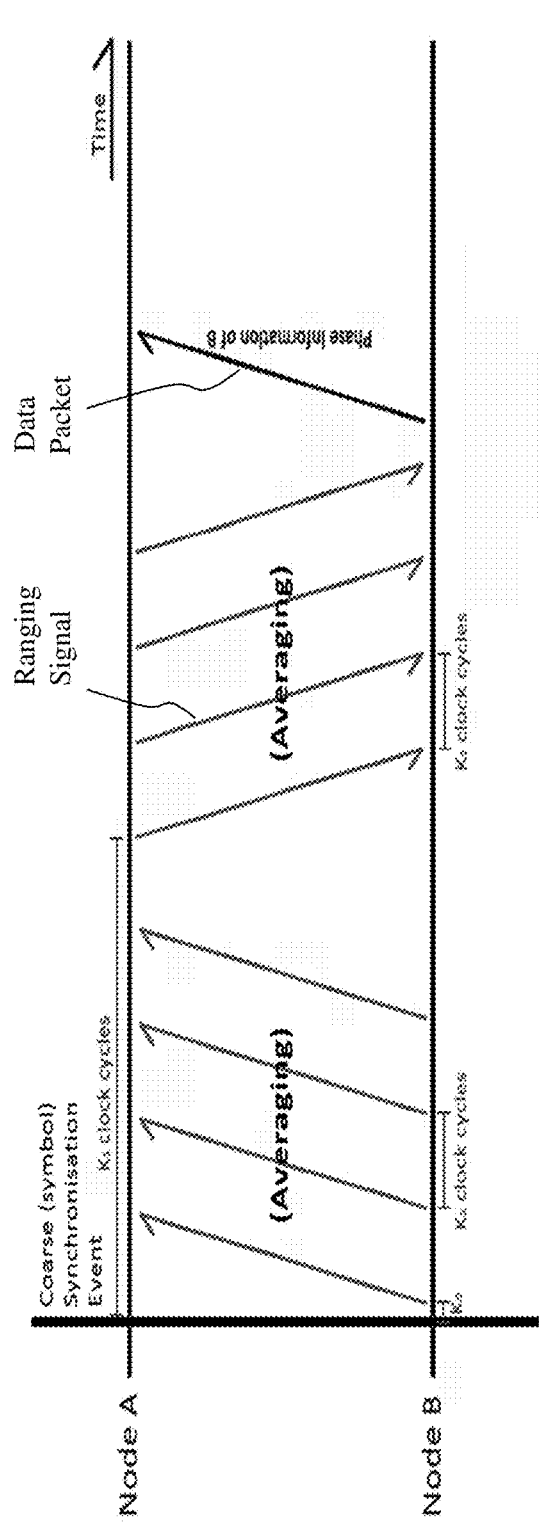
FIG. 13 depicts schematically a data exchange of symbol/pattern information (integration window energy distribution) to communicate the received signal phase according to an embodiment of the invention.

The inventors have therefore established an alternative ranging scheme as an alternative to both ToA and RTT exploiting a transmitter pattern at a known setting and calculating the clock phase difference in both directions. Hence, this is based upon the following:

say $\varphi_{OFFSET}$ is the phase offset between clocks of Node A and Node B, which whilst unknown but does not change significantly over a short period of time ($\varphi_{OFFSET}=\varphi_B-\varphi_A$);
ranging signals going from Node A to Node B arrive at Node B with phase $\varphi_{AB}$=Phase(ToF)+$T_{filters}-\varphi_{OFFSET}$;
ranging signals going from Node B to Node A arrive at Node A with phase $\varphi_{BA}$=Phase(ToF)+$T_{filters}-\varphi_{OFFSET}$;
therefore Phase(ToF)+$T_{filters}=(\varphi_{AB}+\varphi_{BA})/2$; and
$T_{filters}$ be known to a sufficient degree of precision, this being constant and intrinsic to the system This technique exploits the premise that the phase matches delay linearly and accordingly matches the distance. Such a concept is depicted in FIG. 13 using the data exchange in symbol/pattern information (integration window energy distribution) to communicate the received signal phase. The delays K0 and K2 are constant and known whilst K1 varies within a single clock cycle because of the synchronization event coming from Node B. Beneficially, this technique does not require accurate echoing, it has no dependency on transmitter pattern resolution or limitation to its ~4 ns resolution, no drawbacks from corrupted pulses, and has no requirement to receive during the first pulses. However, the delay line accuracy affects both the transmitter and receiver whilst PLL cumulative jitter (—4 ns over a 30 μs period) and crystal clock drift (—0.6 ns over 30 μs) are factors. Further, the ADC quantization noise is significant especially with 3-bit ADCs such as described within WO/2019/000075 and WO 2016/191851. However, most importantly the technique does not allow distinguishing between clock cycles such that the maximum range would be limited to the speed of light times the duration of a clock cycle (48.828 ns) or 14.64 meters (approximately 50 feet). This is certainly sufficient for a wide range of applications such as within residential environments, localized environments within other environments such as offices, retail, etc.

However, in other applications extending the range limit would be beneficial and accordingly the inventors have addressed and considered improvements.

Figure 14:
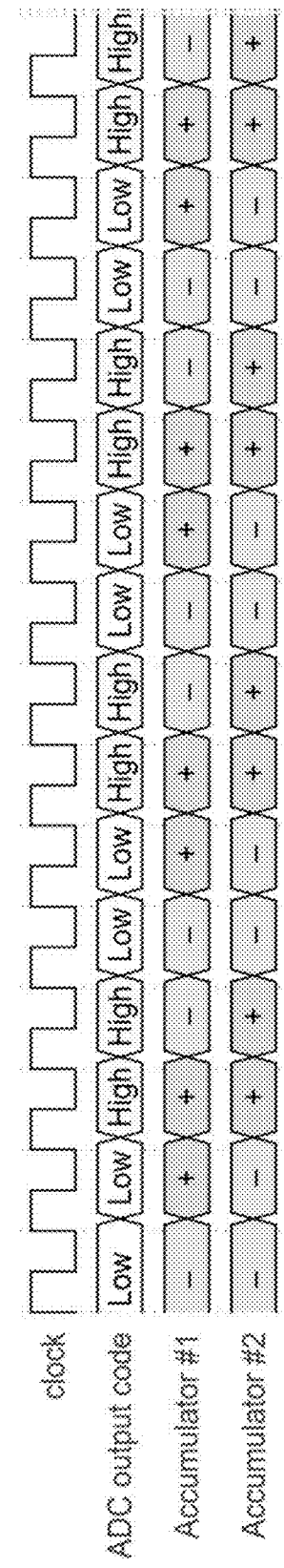
FIG. 14 depicts energy detection according to an embodiment of the invention employing 2 accumulators per integration window as depicted in FIG. 14 where Accumulator #1 does not show a significant correlation whilst Accumulator #2 does show a significant correlation for a specific ranging pulse pattern indicating a phase delay of the ranging signal.

Improvement #1—Periodicity: By making the ranging signal out of a synchronization pattern, such as a short synchronization word for example. If we consider the pattern "0110" then this spans 4×48.8 ns=~195 ns=~58.5 meters (~192 feet). Accordingly, if we increase the number of digital accumulators to 8 for averaging then this is sufficient for this pattern. For each integration window, the energy is accumulated using 2 accumulators per window as depicted in FIG. 14 which depicts the scenario where Accumulator #1 does not show a significant correlation while Accumulator #2 does show a significant correlation for the particular ranging pulse pattern of " . . . 01100110 . . . " indicating the phase delay of the ranging signal" Accordingly, with 8 accumulators and determining which has the strongest signal and its polarity allows the wireless radio controller to distinguish between 16 consecutive integration windows. Further, the uncertainty can be reduced by using the adjacent windows energy distribution. Beneficially, this improvement produces the additional benefit of cancelling both ADC and integration window offsets.

Improvement #2—Delay-line: Digital calibration of the delay line has very limited precision. However, whilst the uncertainty can be improved by providing a DLL and more power this is counter-productive to the goal of low power consumption despite improving both the transmitter pattern dependent processing and receiver integration windows precision. However, only employing the early pulses helps for transmitter timing.

Figure 15:
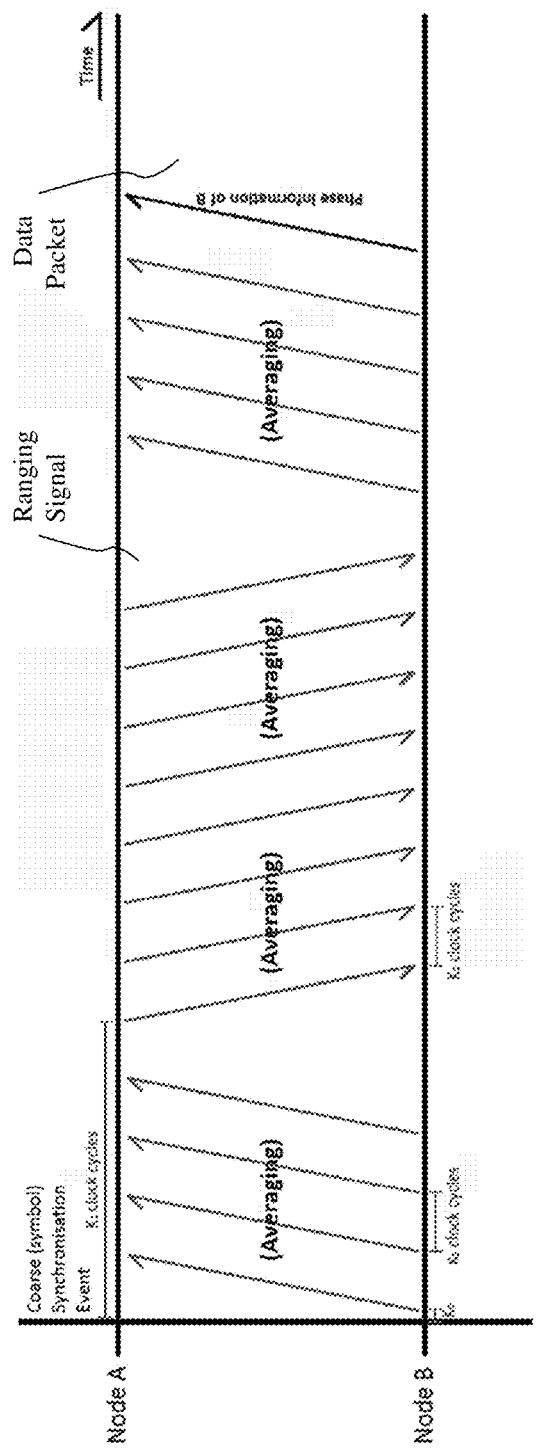
FIG. 15 depicts averaging with respect to range determination according to an embodiment of the invention using a common centroid strategy across the time dimension for improved accuracy, especially against linear clock drift.

Improvement #3—Clock Drift: Within this improvement the assumption is that the clocks of the transmitter and receiver drift linearly relative to each other. Accordingly, as depicted in FIG. 15 averaging is employed using a common centroid strategy across time dimension for better accuracy, especially against linear clock drift.

Figure 16:
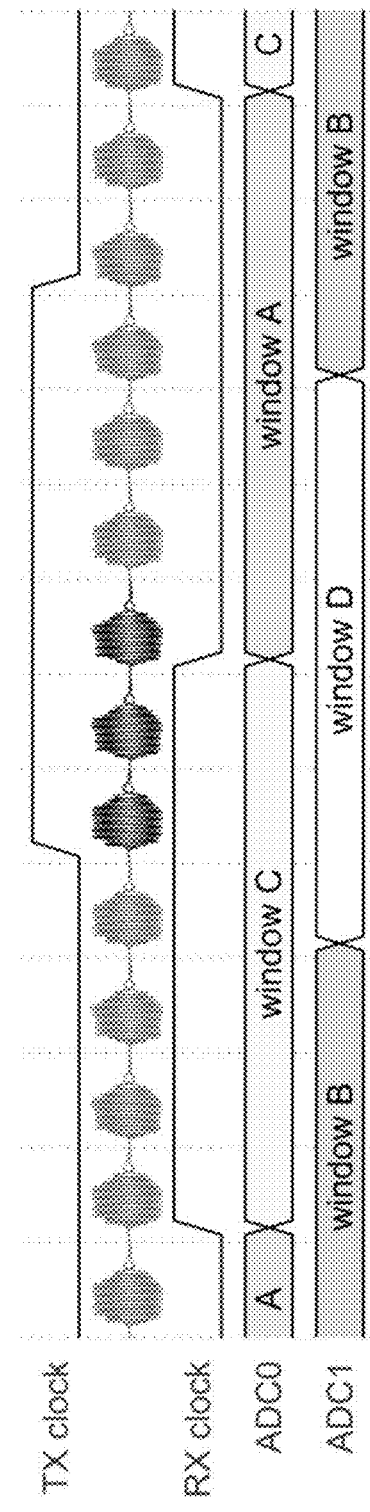
FIGS. 16 and 17 depict a two-step ranging process according to an embodiment of the invention where a ranging signal is transmitted and after a known number of bits the transmitter changes the transmission pattern to transmit only the center pulse where an N-path filter is temporarily disabled so that the integration windows are shrunk around the estimated signal phase.
Figure 17:
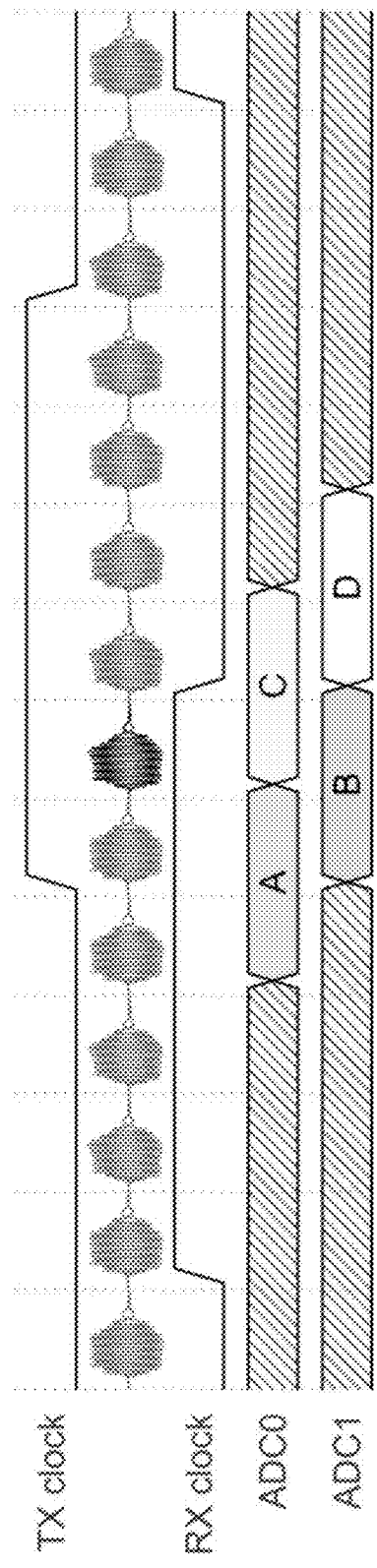

Improvement #4—Narrow Integration Windows: Within the receivers described and depicted within WO 2016/191851 an N-path filter is employed within the receiver chain. However, if the N-path filter is disabled then a two-step process with narrow integration windows such as depicted within FIGS. 16 and 17 may be employed. Considering FIG. 16 and the first step then the process begins by starting to transmit the same ranging signal as discussed previously but then after a known number of bits the transmitter changes the transmission pattern to transmit only the center pulse. Now, with the N-path filter temporarily disabled the integration windows are shrunk around the estimated signal phase whilst adjusting gain as depicted in FIG. 17. Accordingly, the resolution is improved. It would be evident that whilst the specific embodiment described employs an N-path filter that the principles apply to the disabling of all IF and baseband filtering within the receiver chain.

Improvement #5—Integration Window Sweep: Within exemplary receivers described previously with respect to WO/2019/000075 and WO 2016/191851 a single integration window is probed per PLL clock cycle. However, alternatively the receiver could be configured to sweep across all four (or the number implemented) integration windows observing and averaging one at a time. Exploiting this methodology then if the signal is not visible in the first chosen window it is not problem as it is only the signal pattern phase is all that is needed, and hence first/initial bits can be missed. This Integration Window Sweep being applicable in wireless radios according to embodiments of the invention where only one integration window ADC value is observable at any point in time.

Accordingly, when a Serial Peripheral Interface (SPI) is employed to transfer data from the receiver for processing then the SPI master is changed at specific instants where typically 16 SPI clock cycles are required per change. It would be beneficial to synchronize the SPI clock to the PLL clock within the receiver/transceiver. Further, if a microcontroller is employed then operation is required real time as it relies upon the exact and constant number of clock cycle operations both for the SPI and for general purpose input/output (GPIO) sample and control of the microcontroller.

7B. Periodic Non-Data Signal Based Ranging

Within this embodiment of the invention the wireless radios employ a periodic non-data signal which is required by the receiver to capture and average the ranging signal into an energy distribution between phase windows. In order to implement this a set of accumulators are required to store the digitized values of this energy distribution and a fixed (ideally very short) delay between the transmitter and receiver ranging signals. Within a transceiver according to embodiments of the invention where an auto-reply function or feature is enabled then this allows the transceiver to immediately reply to a transmission with another of its own. Accordingly, the delay between the two is short and deterministic.

The preamble of each packet as described within WO/2019/000075 and WO 2016/191851 is a periodic signal which allows the receiver to simply capture and average the signal to get an energy distribution indicating the phase of that signal relative to its own clock. Further, wireless radios according to embodiments of the inventors already possess accumulators dedicated to collecting energy per integration window during receipt of the preamble. However, the requirements for these accumulators are insufficient for this requirement and they are also required to properly track the preamble and adjust the gain. Accordingly, additional accumulators are needed in parallel.

Figure 18:
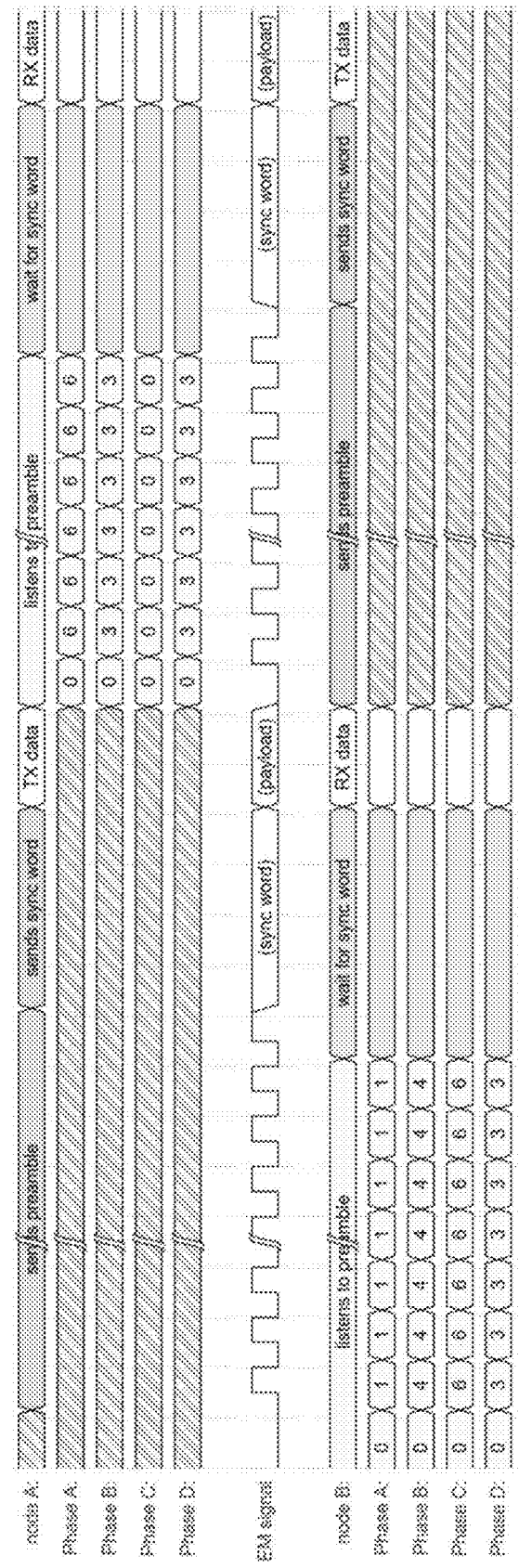
FIG. 18 depicts a schematic with respect to receiver and transmitter side processing with accumulators upon a preamble pattern according to an embodiment of the invention.

Referring to FIG. 18 there is depicted schematically implementation of this embodiment of the invention for the receiver and transmitter side processing with accumulators identified as Phase A to Phase D. These being the ADC output signals within the wireless radio circuit(s), for example within an ASIC, that are input into a wireless modem according to embodiments of the invention. These correspond to integration window energy values for each symbol clock cycle and not to accumulators. Within the scenario depicted in FIG. 18 the ADCs are 3-bit ADCs and hence these values range 0 to 7. It would also be evident that FIG. 18 is a simplified representation wherein only the "1"s of the preamble are shown, whereas normally there would be '0's between each.

However, the preamble pattern has a periodicity of only two symbols which yields to some ambiguity within the algorithm applied as one phase value could be the result of two very different distances. By implementing a register or register field within a node receiving the reply, which the inventors refer to as a receiver waited (RX_WAITED) register, then the node is aware of how many clock cycles of delay there have been between the end of the original transmitted packet and the end of the synchronization word of the reply which provides for disambiguation. Whilst the RX_WAITED provides for a very coarse ranging metric the phase information fulfills the need for finer accuracy. Accordingly, adding additional accumulators to provide this phase information is a low impact enhancement to the transceiver design. Optionally, the accumulator values could be made available as read-only register fields in common with those for the other accumulators. An algorithm providing the required functionality would probably require firmware intervention to exchange all the necessary information.

Transceivers according to embodiments of the invention would exploit a procedure comprising:

"Agree" with the node the transceiver wishes to compute the distance to on a timeslot to exchange ranging information;
  Enable an auto-reply function (all settings apply to both sides);
  Set the preamble length to an appropriate value, the longer the preamble length the more averaging is applied but also more clock drift; and
  (Optional) employ minimum possible packet size so as to minimize the delay between the preambles being exchanged as ranging signals (e.g. no PPM, no forward error correction (FEC), a packet size equal to 1, no cyclic redundancy check, etc.).

After packet exchange for phase information gathering, read RX_WAITED (replying side only) and read phase information (both sides). This allows the nodes to exchange the information read with the other node and to collect all the information for processing all on one side. For flexibility the ranging equation may be implemented in the firmware.

Based upon potential applications including, for example, embedded sensors requiring very low power and low complexity design as well as other power and cost limited system the receiver has to be configurable digitally using very simple control circuitry. Furthermore, the integration window has to be easily tunable considering the high sensitivity of energy detection receiver to proper integration window synchronization. Different modulation, data rates and burst length will also need to change the shape of the integration duty cycle and all the power management must properly keep in synchronization.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   providing data to an ultra-wideband (UWB) transmitter comprising a controller circuit for transmission by the ultra-wideband (UWB) transmitter; wherein
   the data for transmission by the UWB transmitter has been encoded with a process comprising merging at least a first pulse N-bit pulse position modulation (PPM) symbol with a second pulse N-bit PPM symbol to generate an R-pulse 2N-bit Encoded Bundle Pulse Modulation (EBPM) symbol;
   R and N are positive integers greater than or equal to 2; and
   the R-pulse 2N-bit EBPM symbol encodes the 2N-bits into the same number of pulses as employed for each N-bit PPM symbol.

2. A method comprising:
   providing data to an ultra-wideband (UWB) transmitter comprising a controller circuit for transmission by the ultra-wideband (UWB) transmitter; wherein
   the data for transmission by the UWB transmitter has been encoded with a process comprising merging at least a first pulse N-bit symbol with a second pulse N-bit symbol to generate an R-pulse 2N-bit Encoded Bundle Pulse Modulation (EBPM) symbol; and
   R and N are positive integers greater than or equal to 2.

3. A method comprising:
   providing data to an ultra-wideband (UWB) transmitter comprising a controller circuit for transmission by the ultra-wideband (UWB) transmitter; wherein
   the data for transmission by the UWB transmitter has been encoded with a process comprising merging at least a first pulse N-bit symbol with a second pulse N-bit symbol to generate an R-pulse 2N-bit Encoded Bundle Pulse Modulation (EBPM) symbol;
   R and N are positive integers greater than or equal to 2; and
   the first pulse N-bit symbol and the second pulse N-bit symbol are a pair of a plurality of pulse N-bit symbols combined to form the R-pulse 2N-bit EBPM symbol.

4. A method comprising:

providing data to an ultra-wideband (UWB) transmitter comprising a controller circuit for transmission by the ultra-wideband (UWB) transmitter; wherein the data for transmission by the UWB transmitter has been encoded with a process comprising merging at least a first pulse N-bit symbol with a second pulse N-bit symbol to generate an R-pulse 2N-bit Encoded Bundle Pulse Modulation (EBPM) symbol;

R and N are positive integers greater than or equal to 2; and a portion of the generated R-pulse 2N-bit EBPM symbols comprise patterns which are invalid for the N-bit symbols.

* * * * *